United States Patent [19]

Benton

[11] Patent Number: 5,519,644
[45] Date of Patent: May 21, 1996

[54] CONTINUOUSLY CALIBRATING TEMPERATURE CONTROLLER

[75] Inventor: Gene A. Benton, White Hall, Md.

[73] Assignee: Becton Dickinson and Company, Franklin Lakes, N.J.

[21] Appl. No.: 512,578

[22] Filed: Aug. 22, 1995

Related U.S. Application Data

[63] Continuation of Ser. No. 177,829, Jan. 5, 1994, abandoned.

[51] Int. Cl.$^6$ .................................................. G01K 15/00
[52] U.S. Cl. .................... 364/571.01; 364/557; 374/132; 73/1 R
[58] Field of Search ............... 364/571.01, 571.02, 364/557; 374/1, 25, 114, 129, 132, 197; 370/112, 119; 73/1 R, 765, 767, 771, 772

[56] References Cited

U.S. PATENT DOCUMENTS

| | | | |
|---|---|---|---|
| 4,122,719 | 10/1978 | Carlson et al. | 73/342 |
| 4,480,312 | 10/1984 | Wingate | 364/557 |
| 4,528,637 | 7/1985 | Smith | 364/557 |
| 4,532,601 | 7/1985 | Lenderking et al. | 364/557 |
| 4,740,966 | 4/1988 | Goad | 370/112 |
| 4,755,958 | 7/1988 | Mizuhara | 364/557 |
| 4,800,513 | 1/1989 | Deutsch | 364/571 |
| 5,095,453 | 3/1992 | Pierson et al. | 364/571.01 |
| 5,101,315 | 3/1992 | Ishikawa et al. | 364/557 |
| 5,105,366 | 4/1992 | Beckey | 364/557 |
| 5,116,136 | 5/1992 | Newman et al. | 364/557 |
| 5,136,525 | 8/1992 | Cloud | 364/557 |
| 5,230,055 | 7/1993 | Katz et al. | 364/557 |

FOREIGN PATENT DOCUMENTS

| | | |
|---|---|---|
| 0120102 | 10/1984 | European Pat. Off. . |
| 3313559 | 10/1984 | Germany . |
| 54194325 | 11/1982 | Japan . |

OTHER PUBLICATIONS

"BACTEC 9120" Advertising Brochure (Becton Dickinson and Company, 1992).
"BACTEC 9240" Advertising Brochure (Becton Dickinson and Company, 1993).
"Anafaze MLS Modular Loop System—Installation And Operation Manual" (Anafaze Incorporated, 1991).
A. Corripio, *Tuning of Industrial Control Systems*, pp. 114–115 (Instrument Society of America, 1990).
*Data Converter Reference Manual*, vol. 2, p. 3–42 (Analog Devices Inc., 1992).

*Primary Examiner*—Ellis B. Ramirez
*Assistant Examiner*—Thomas Peeso
*Attorney, Agent, or Firm*—David W. Highet

[57] ABSTRACT

A multiple-loop temperature controller using RTD sensors is continuously calibrated by performing a zero or full scale calibration during each operating cycle. An arrangement of four multiplexers is used to successively connect each RTD sensor to a pair of current sources and an A/D converter, thereby allowing the current sources and A/D converter to be shared among all of the RTD sensors. Measurement errors are minimized by using the same multiplexers for temperature measurement and calibration, with calibration being performed by connecting the multiplexers to a ground reference or precision resistor. Interrupt-driven temperature loop processing is used to reduce A/D conversion delays, thereby allowing high-precision A/D converters with long settling times to be used. The multiple-loop temperature controller is advantageously utilized in an automated blood culturing system requiring precise control of sample temperatures.

41 Claims, 23 Drawing Sheets

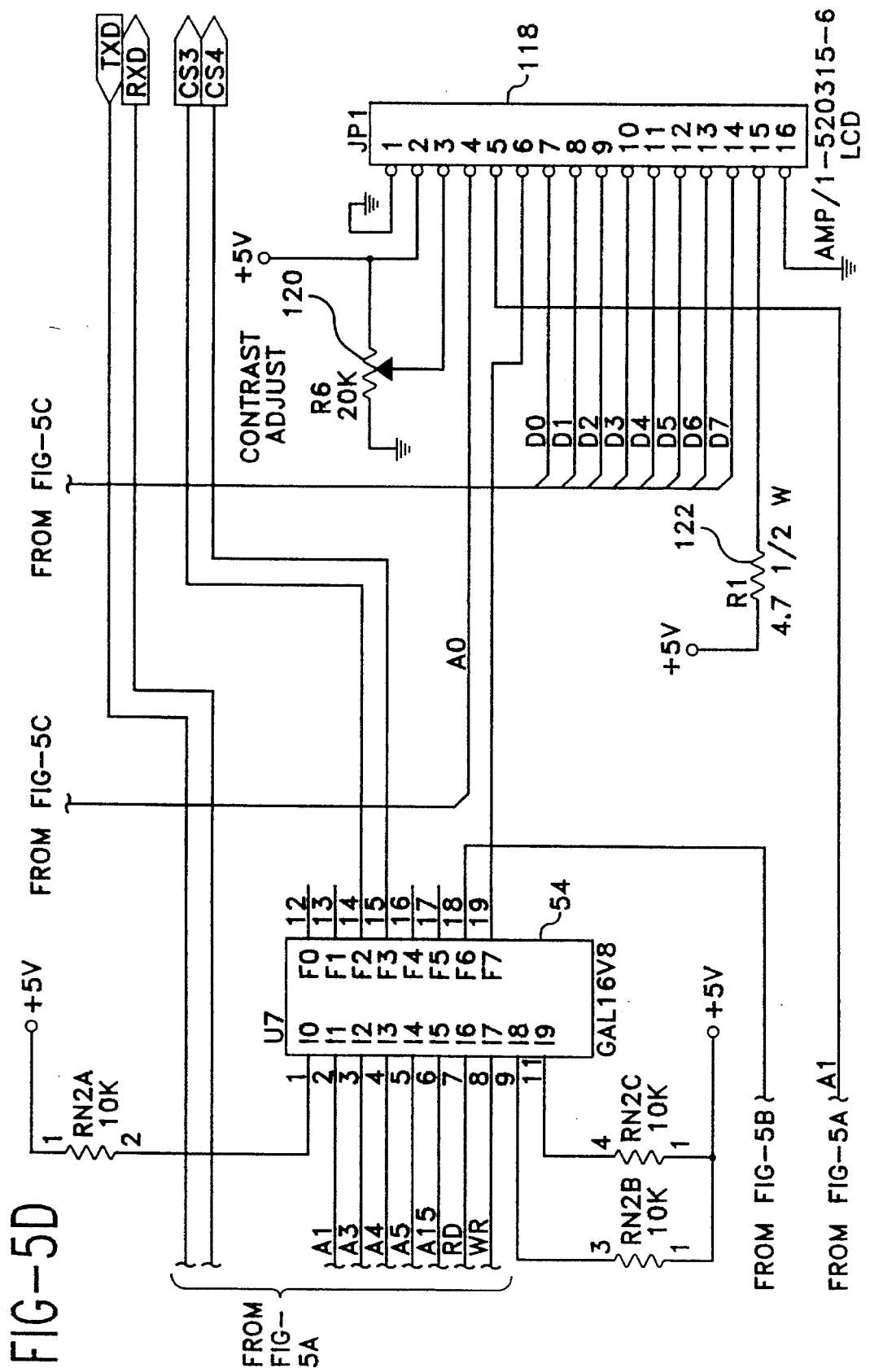

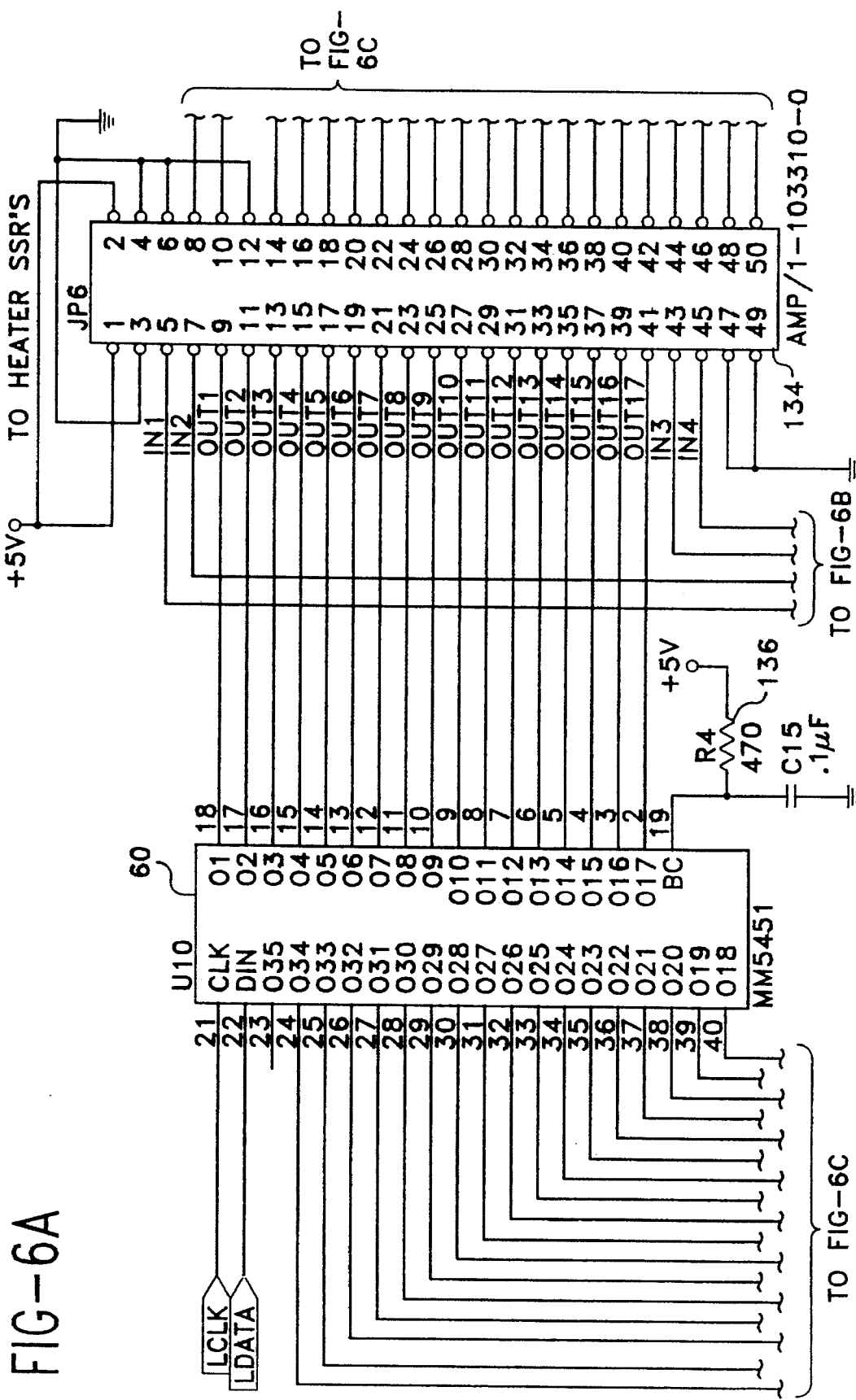

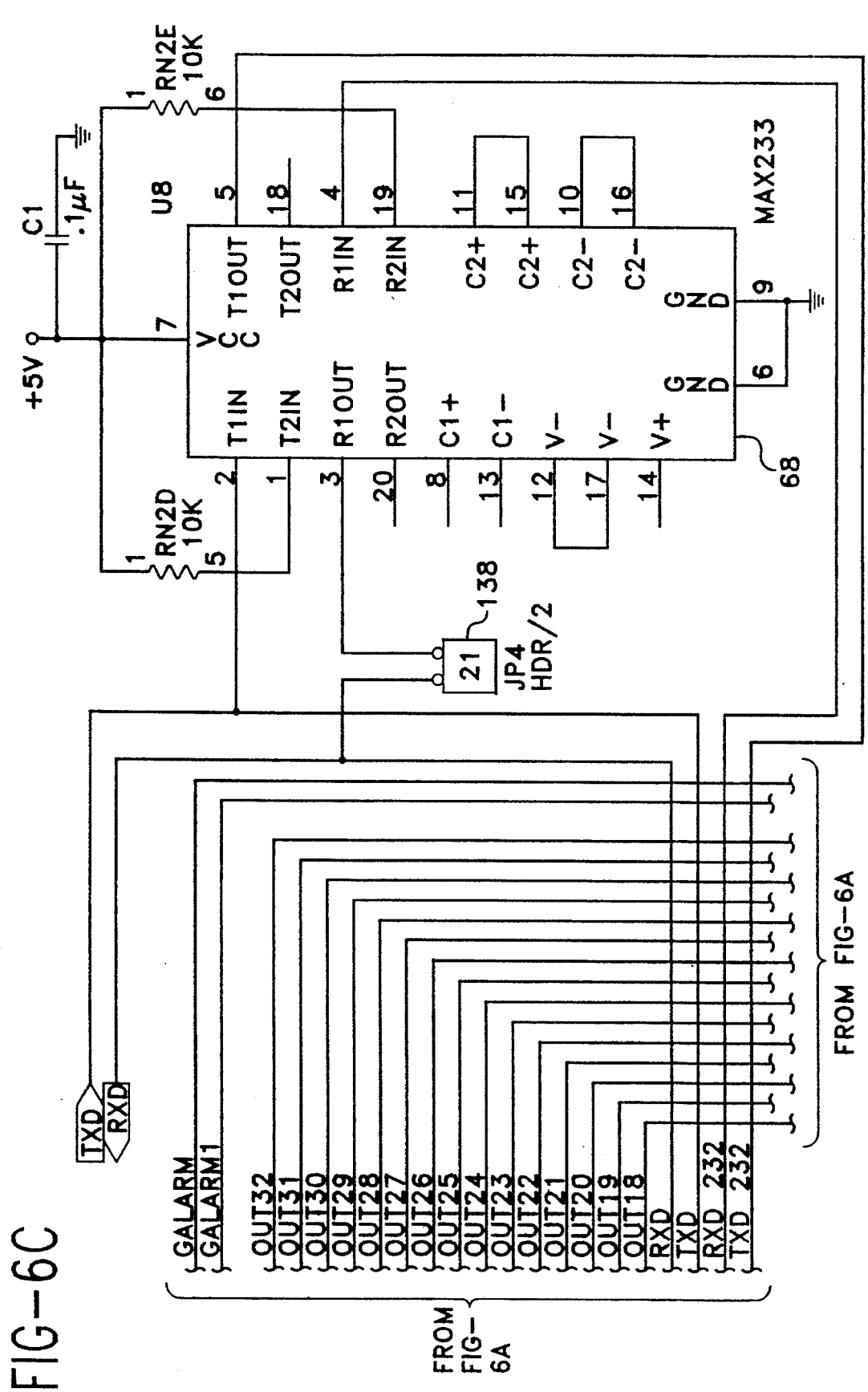

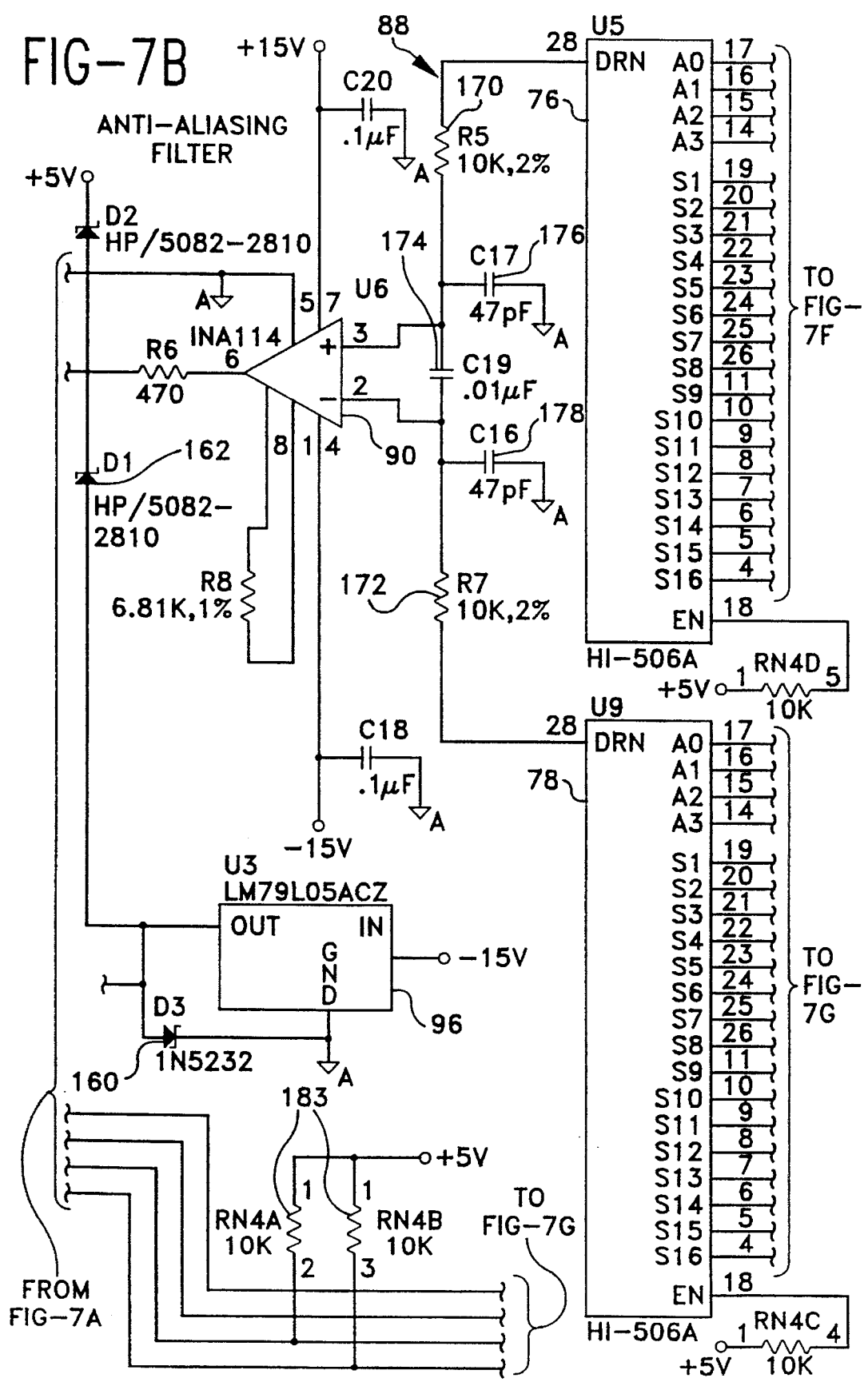

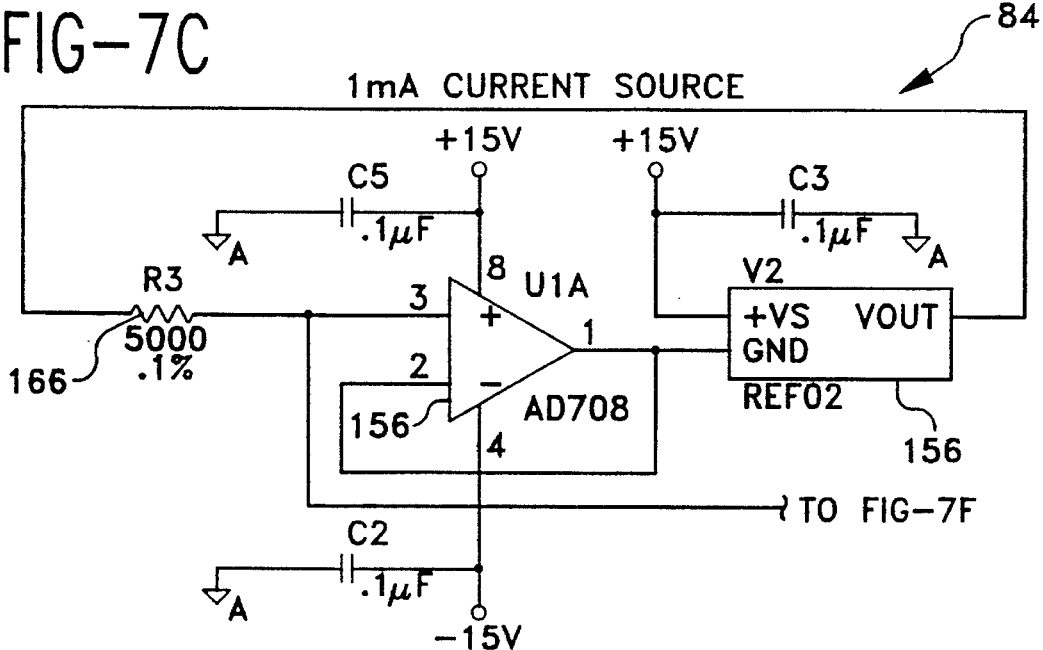
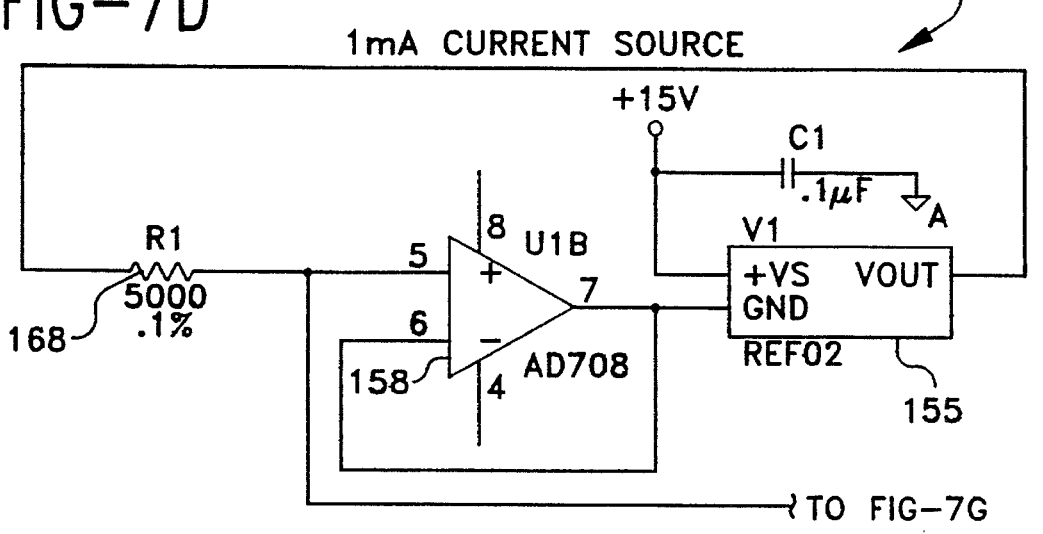
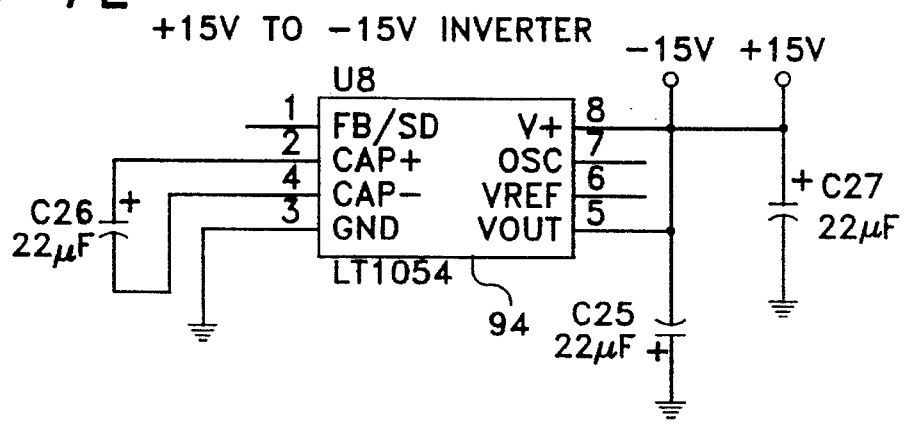

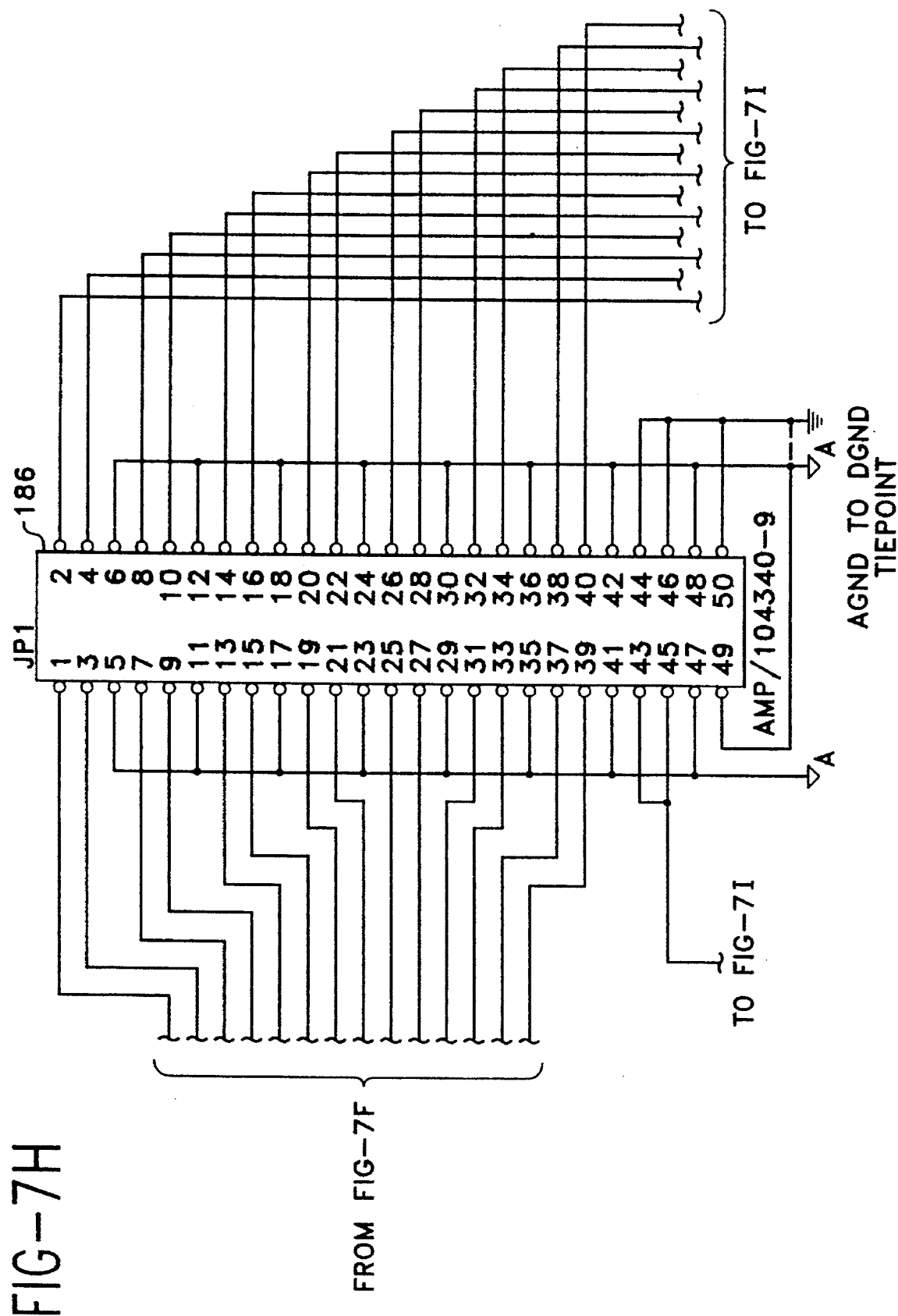

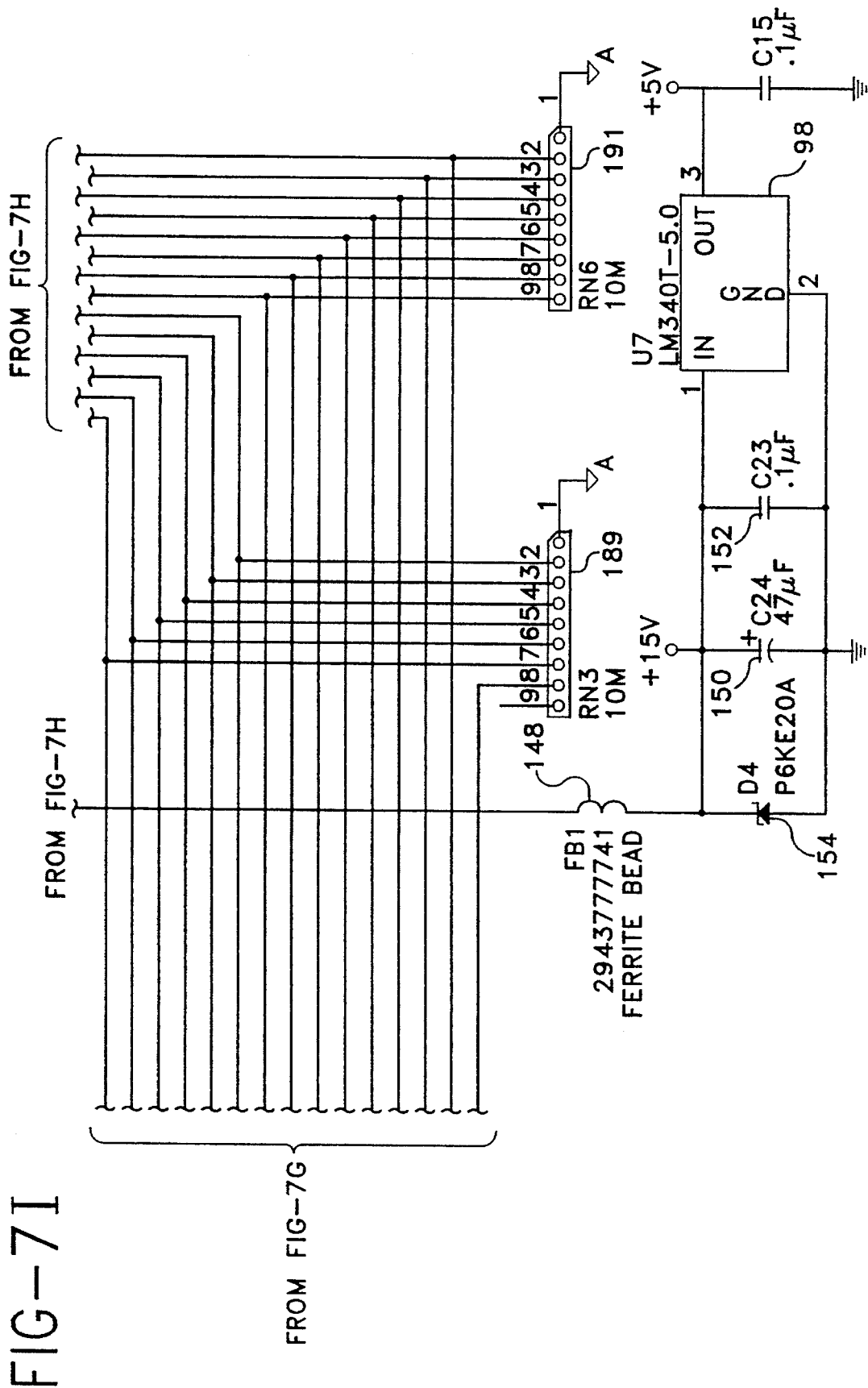

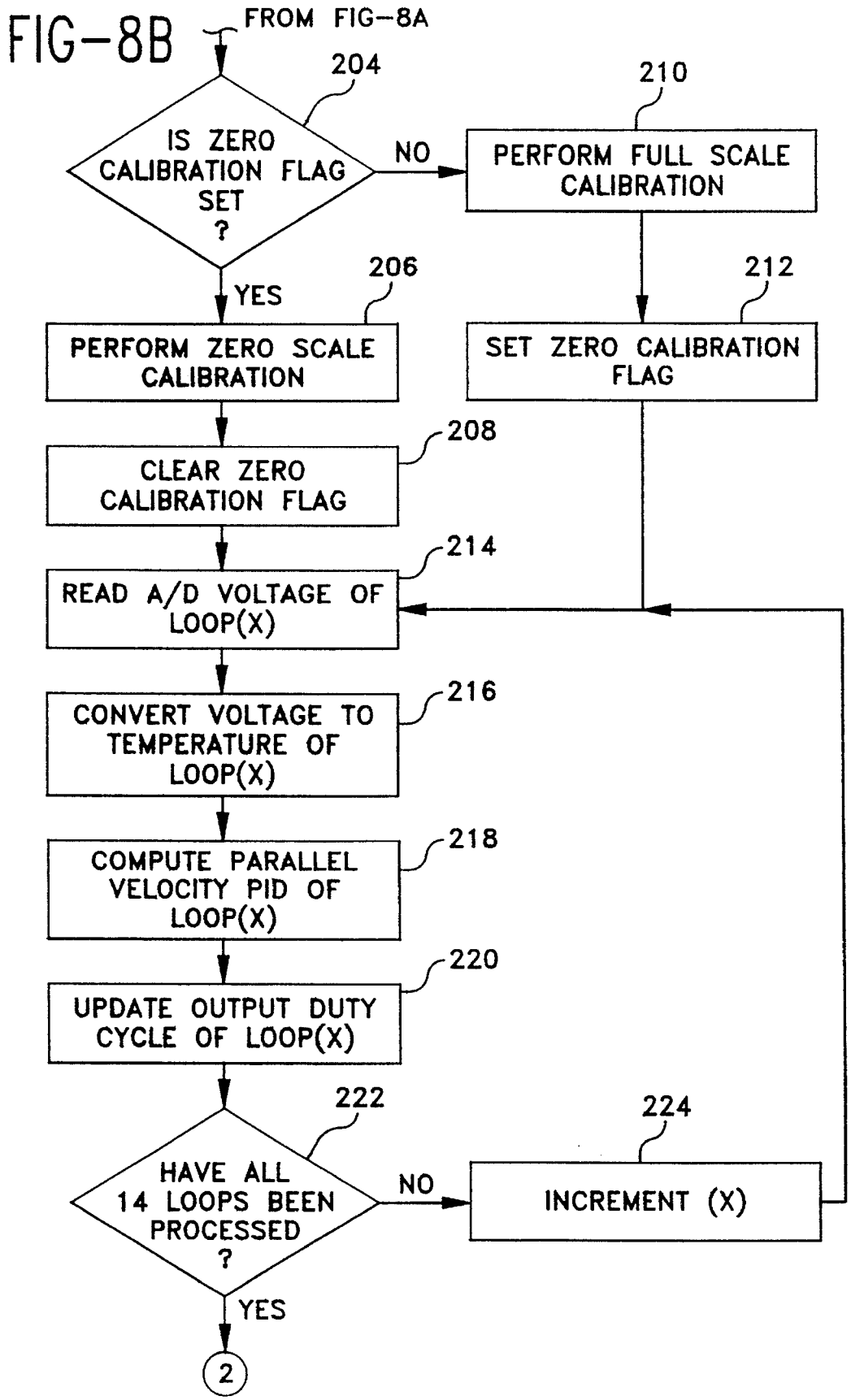

CONTINUOUSLY CALIBRATING TEMPERATURE CONTROLLER

This is a continuation of application Ser. No. 08/177,829 filed Jan. 5, 1994, now abandoned.

BACKGROUND OF THE INVENTION

The present invention relates to measurement and control systems which are applicable to various types of industrial and scientific processes, and is particularly concerned with a multiple-loop temperature controller for use in automated blood culturing systems and other types of medical and biological testing systems requiring precise temperature control.

In the fields of industrial and scientific process control, there are many situations in which it is necessary to maintain precise control over one or more parameters, such as temperature. Typically, this is done by continuously measuring the parameter of interest and maintaining a desired set point value of the parameter using some type of closed-loop control system, such as a proportional integral derivative (PID) controller. In automated blood culturing systems, for example, the parameter of interest is temperature and the control system is designed to maintain a specific set point temperature (usually 35° C.) which is favorable to the growth and detection of bacteria and other microorganisms.

In the BACTEC® automated blood culturing system developed by Becton Dickinson and Company, the assignee of the present invention, individual blood samples to be cultured are placed in vials which are coated internally with a composition that fluoresces in the presence of carbon dioxide ($CO_2$) produced by microbes. The vials are placed in an enclosed cabinet or housing which is heated to a predetermined temperature (preferably 30° C.) somewhat lower than the desired vial temperature, and are held in racks which are separately heated to produce the desired 35° C. vial temperature. The vials are received in individual cavities or wells formed in the racks, and are agitated by continuous rotation to promote microorganism growth. Each cavity contains a light-emitting diode (LED) and a cooperating photodiode detector, with suitable filters to restrict the LED and photodiode to specific wavelengths of light. The LED serves as an excitation source for causing the $CO_2$-responsive material at the bottom of the vial to fluoresce, and the photodiode detector is used to detect this fluorescence to provide an indication that a certain level of bacterial or fungal growth has occurred in the vial. By detecting microorganism growth in this way, the blood culturing system can operate automatically under computer control, without the need for continuous human supervision. In the BACTEC® system, each cabinet is designed to accommodate up to six racks holding up to 240 individual vials, and several cabinets can be monitored by a single computer.

The accuracy of an automated blood culturing system of the type described above depends to a great extent on maintaining a precisely controlled temperature at each of the test vials. This is done by providing each rack with a separate heating device and temperature sensor, and by connecting the heating devices and temperature sensors to a closed-loop temperature control system that operates under microprocessor control. Rather than utilizing a separate control system for each rack or loop, a multiple-loop control system is provided in which the microprocessor operates in a time-shared manner to control all of the temperature loops essentially simultaneously. The processing speed of currently available microprocessors is sufficiently fast that precise temperature control can be achieved even when a relatively large number of racks or loops are being controlled.

In order to allow for time-shared operation of a temperature controller, some means must be provided to obtain temperature readings from the individual temperature sensors on a periodic or cyclical basis. When precise temperature control is required, the cycle time must be fairly short so that any temperature excursions can be quickly detected and corrected. However, time-shared operation with multiple sensors can present difficulties when certain types of temperature sensors are used, such as platinum resistance temperature devices (RTDs). RTDs are capable of detecting temperatures with great accuracy, but they are passive devices and require a power source in order to produce an output representing the sensed temperature. This can be achieved by connecting each RTD into a resistive bridge circuit and using the output voltage of the bridge to represent the sensed temperature. However, this arrangement is disadvantageous in a multiple-sensor system, not only because a large number of components are required for the various bridge circuits, but also because slight differences among nominally identical components can significantly affect the accuracy of temperature measurement. Moreover, the bridge output from each sensor must be converted to digital form for use by the microprocessor, and this has been done by using a specific type of analog-to-digital (A/D) converter, known as a voltage-to-frequency (V/F) converter, to convert the bridge voltage to a frequency value which can then be converted to a digital temperature value by the microprocessor. Since it is not practical to provide a separate V/F converter for each temperature sensor, a multiplexer is used to switch this component among the various sensors. Unfortunately, the multiplexer itself can introduce temperature measurement errors due to leakage currents within the multiplexer.

In general, calibration can be used to eliminate or reduce certain types of errors which can occur in temperature measurement and control systems. However, if calibration occurs only during the initial power-up interval, some types of errors (such as temperature drift of component values) will not be corrected. Moreover, calibration is effective only to the extent that the same components and interconnections used during the actual measurement operation are also used during the calibration operation, so that any errors contributed by these components and interconnections will be taken into account. When some or all of the components and interconnections used to calibrate the measurement device are different from those used during the measurement operation, the potential for inaccuracy remains.

As noted previously, voltage-to-frequency (V/F) converters have been used previously to convert the analog voltage signals from RTD sensors to frequencies, which are in turn converted to digital temperature values for processing. Although this is a useful method for converting analog RTD outputs to digital temperature values, certain newer types of analog-to-digital (A/D) converters provide much greater conversion accuracy than V/F converters. In particular, sigma delta or charge balancing A/D converters provide higher resolution and lower nonlinearity error than V/F converters. Sigma delta A/D converters also contain internal digital filters which provide excellent filtering of line frequency noise that may occur on RTD wire runs. Unfortunately, the relatively long settling time of the digital filter in a sigma delta A/D converter makes it difficult to use such a converter in a time-shared measurement or control system, since the data does not become available at the outputs of the A/D converter quickly enough to maintain a rapid cycle time for the system as a whole. Ideally, it would be desirable to overcome this obstacle so that sigma delta A/D converters, with their attendant advantages of high resolution, low nonlinearity error and superior filtering, can be employed in time-shared measurement and control systems without requiring unduly long cycle times.

SUMMARY OF THE INVENTION

In accordance with the present invention, the foregoing disadvantages and limitations are avoided by providing a multiple-loop temperature controller in which continuous calibration is carried out in order to avoid the effects of temperature drift and other source of measurement error. A novel arrangement of multiplexers is also provided in order to allow many of the major components of the temperature measurement system, such as the analog-to-digital converter and precision current sources, to be shared among the various temperature sensors. This not only reduces the cost and complexity of the system, but also increases accuracy since a shared component eliminates the possibility of slight differences that can always exist among non-shared components that are nominally identical. Moreover, by using the same multiplexers for both measurement and calibration, any measurement errors contributed by the multiplexers themselves are cancelled out. Finally, the present invention contemplates a novel processor control arrangement which allows an analog-to-digital converter with a relatively long settling time, such as a sigma delta A/D converter, to be used in the temperature measurement loop without unduly lengthening the cycle time of the system as a whole.

In accordance with one aspect of the present invention, a continuously calibrating measurement system comprises a first input line adapted to be connected to a sensor for sensing a parameter to be measured and producing an output signal representative thereof, and a second input line adapted to be connected to a first calibration device for establishing a first calibration value of the sensor input signal. A control device is coupled to the first and second input lines for producing an output value of the parameter during each of a plurality of successive cycles of operation. The control device is operative to perform a measurement operation using the sensor output signal during each of the successive cycles of operation, and to perform a first calibration operation using the first calibration value during at least some of the successive cycles of operation.

In accordance with a further aspect of the present invention, a multiple-channel temperature measurement system comprises a plurality of temperature inputs adapted to be connected to a corresponding plurality of resistance temperature devices for sensing temperatures at a plurality of locations, a current circuit for applying a known current to a selected one of the resistance temperature devices through the corresponding one of the temperature inputs to produce an analog voltage output indicative of a sensed temperature, and a measurement circuit for converting the analog voltage to a temperature value. The measurement system further comprises a first multiplexer circuit connected between the current circuit and the plurality of temperature inputs for selectively connecting the current circuit to individual ones of the resistance temperature devices, and a second multiplexer circuit connected between the measurement circuit and the plurality of temperature inputs for selectively connecting the measurement circuit to individual ones of the resistance temperature devices. A control circuit is provided for controlling the first and second multiplexer circuits to successively connect each of the temperature inputs to the current circuit and simultaneously to the measurement circuit.

In accordance with a still further aspect of the present invention, a measurement system comprises a first input line adapted to be connected to a first sensor for sensing a parameter to be measured and producing an analog output signal representative thereof, and an analog-to-digital converter for converting an analog output signal from the first sensor to a digital output value. The analog-to-digital converter has an analog input coupled to the first input line, a digital output, and a data ready output. The measurement system further comprises a programmable microprocessor coupled to the digital output for processing the digital output value. The microprocessor has an interrupt input coupled to the data ready output of the analog digital converter, and is programmed to process the digital output value from the analog-to-digital converter in response to an interrupt signal on the interrupt input.

The present invention is also directed to novel methods for operating a measurement or control system, and for performing multiple-channel temperature measurements in such a system. These methods may be carried out by the exemplary apparatus disclosed and claimed herein.

BRIEF DESCRIPTION OF THE DRAWINGS

The various advantages and novel features of the present invention will be more readily apprehended from the following detailed description when read in conjunction with the appended drawings, in which:

FIGS. 7A–7I are detailed schematic diagrams of the analog circuit board of FIG. 4;

FIGS. 8A–8C are a flow chart illustrating the manner in which the microcontroller used in the digital board of FIGS. 3, 5 and 6 is programmed to carry out initialization, calibration and temperature measurement functions.

Throughout the drawings, like reference numerals will be understood to refer to like parts and components.

DETAILED DESCRIPTION OF THE PREFERRED EMBODIMENT

Figure 1:
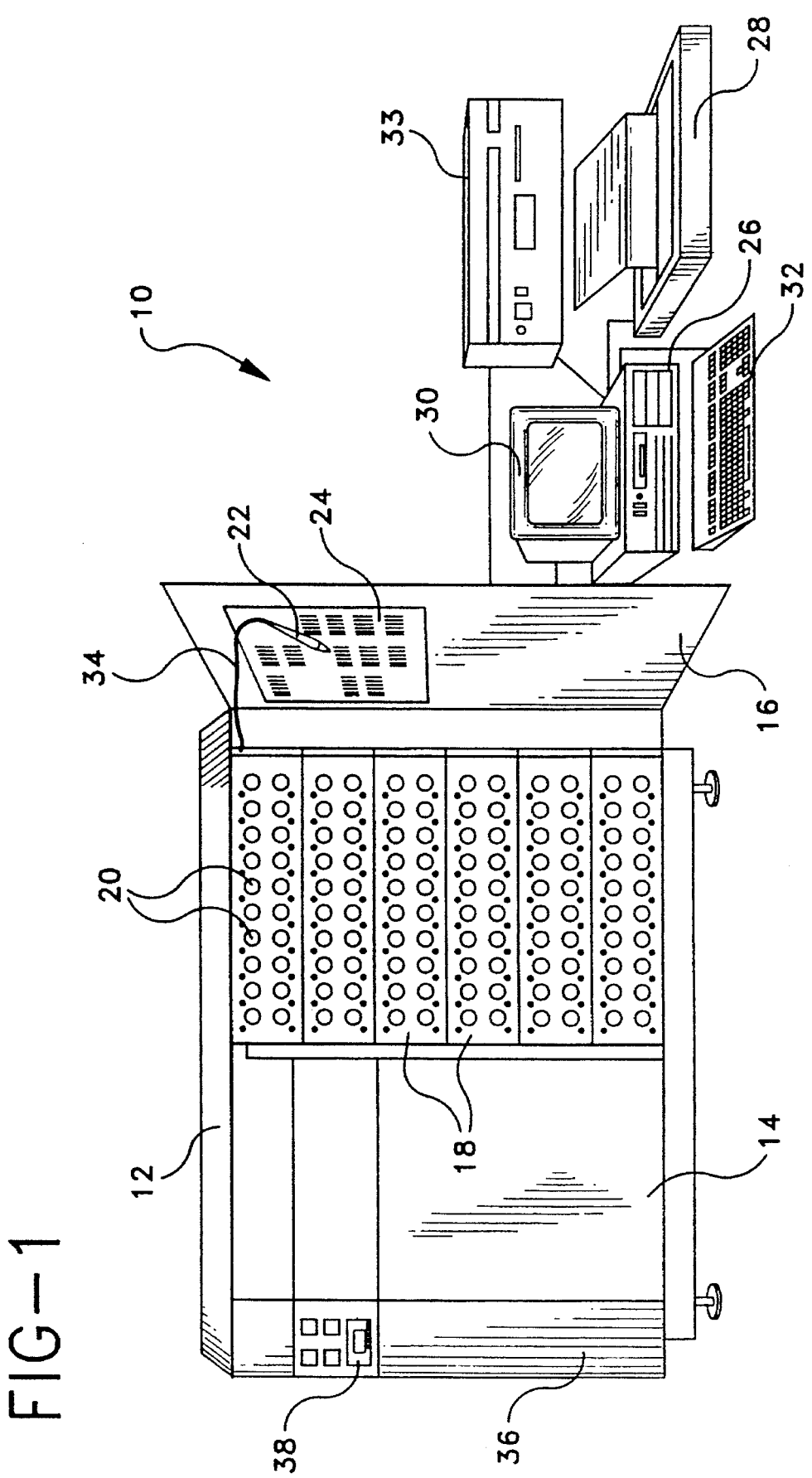
FIG. 1 is a perspective view of an automated blood culturing system in which a multiple-loop temperature controller in accordance with the present invention may be employed, with one of the doors of the incubator cabinet shown in the open position to illustrate the internal racks and test vials.

FIG. 1 is a perspective view of an automated blood culturing system 10 which may utilize a multiple-loop temperature controller constructed in accordance with the present invention. The system shown is the BACTEC® Model 9240 automated blood culturing system developed by the assignee of the present invention, Becton Dickinson and Company. The system 10 includes a cabinet 12 with a pair of hinged doors 14 and 16, with the door 16 being shown in the open position. The interior of the cabinet 12 is provided with six horizontal racks 18 which are stacked vertically with respect to one another. Each rack holds forty test vials 20 in two rows of cavities or wells which are referred to as vial stations. During operation of the system 10, the racks are agitated through a 20° angle, beginning at a horizontal vial orientation and tilting the bottle upward by 20°, at thirty agitation cycles per minute. The agitation improves organism recovery and detection time, and stops automatically when either of the cabinet doors 14 and 16 is opened.

Each of the racks 18 is controlled by an independent microprocessor, which is responsible for vial testing and positivity analysis. A barcode scanner 22 and barcode menu 24 are provided on the interior of the door 16 to allow certain functions to be performed by the user. For example, by scanning menu options and vial labels, the user can enter vials into the system, removed positive and negative cultures, and resolve errors. The functions of the barcode menu 24 are also available on the display 30 of the system computer 26 to provide a backup mechanism in the event that the barcode scanner 22 fails.

The system computer 26 stores all of the software for the automated blood culturing system 10 (other than rack and cabinet temperature control firmware), including the applications software which controls all system operations and the user interface software which enables the user to view test results, print reports, identify errors, and so on. A printer 28 is connected to the system computer 26 to enable hard copy reports of tests results to be printed. In addition to a high-speed processor board, the computer 26 contains memory and communications boards, a hard disk drive to store programs and data, a floppy disk drive for backups and software updates, and a video board to operate the computer display monitor 30. The monitor 30 provides system displays, and a keyboard 32 enables the user to enter information and commands. The barcode scanner 22 is connected to the system computer 26 by means of a cable 34 to allow the user to log in specimens and perform other functions as described previously. An uninterruptible power supply 33 provides regulated and filtered power to the system 10, and also provides up to ten minutes of backup power in the event of a complete power failure.

The vials 20 are coated internally with a material that fluoresces in the present of carbon dioxide produced by the growth of bacteria or fungi. Each of the cavities or wells in which the vials 20 are received contains a light-emitting diode (LED) and filter for exciting the $CO_2$-responsive material with a specific wavelength of light, thereby causing it to fluoresce when microorganism growth has occurred. Each well also contains a photodiode detector and filter for detecting the resulting fluorescence, thereby indicating that a certain level of bacterial or fungal growth has occurred in the corresponding vial. This information is provided to the system computer 26, so that test results can be compiled for all of the vials 20 within the cabinet 12. Display LEDs are also provided at visible locations adjacent to each of the wells in order to alert the user to final negative and positive test results, error conditions, and so on. This allows the user to visually ascertain the status of each vial by opening the cabinet doors 14 and 16, so that specific vials can be inserted or removed as appropriate.

The temperature of each of the racks 18 is individually monitored and controlled by a multiple-loop temperature controller whose construction and operation will be described in detail shortly. The temperature controller is preset to maintain rack temperatures at 35° C.±1.5° C. Over-temperature and under-temperature alarm set points are preset at 36.5° C. and 33.5° C., respectively. The temperature controller is also preset to maintain the air within the cabinet 12 at 30° C. The temperature controller receives inputs from platinum resistance temperature devices (RTDs), with one RTD sensor being provided for each of the six racks 18 and a seventh RTD sensor being provided to sense the temperature of the cabinet interior. The RTD sensors are preferably Hy-Cay Engineering PT100.110X.6-24-3 devices with a nominal resistance of 100 ohms at 0° C. and a temperature variation of approximately 0.385 ohms per °C. Each RTD sensor is part of a separate control loop which also includes a corresponding resistance heating device to maintain the desired set point temperature (i.e., 30° C. or 35° C.) at the RTD sensor location. The resistance heating devices are affixed to aluminum blocks forming part of the racks 18, with the aluminum blocks serving to conduct heat to the various test vials 20 in each rack.

The multiple-loop temperature controller, together with power supplies and other electronic components, is enclosed in a housing 36 which is affixed to the left-hand side of the cabinet 12. A control panel 38 for the multiple-loop temperature controller is provided on the front surface of the housing 36. The control panel 38, which is shown in more detail in FIG. 2, includes a liquid crystal display (LCD) 40 for continuously displaying loop temperatures, and a keypad consisting of a number of membrane-type pushbuttons 42–48. One pushbutton 42 is provided for enabling certain functions which require the use of the display 40, and three additional pushbuttons 44, 46 and 48 serve as soft keys for selecting individual functions defined by the display 40. These functions include clearing alarms, displaying resistance heater duty cycles, changing temperature set points, and the like. When no functions are selected, the display 40 indicates the current temperatures of the loops A through G, as shown. In the illustrated embodiment, loops A through F correspond to the six racks 18, while the loop G corresponds to the interior of the cabinet 12.

Figure 2:
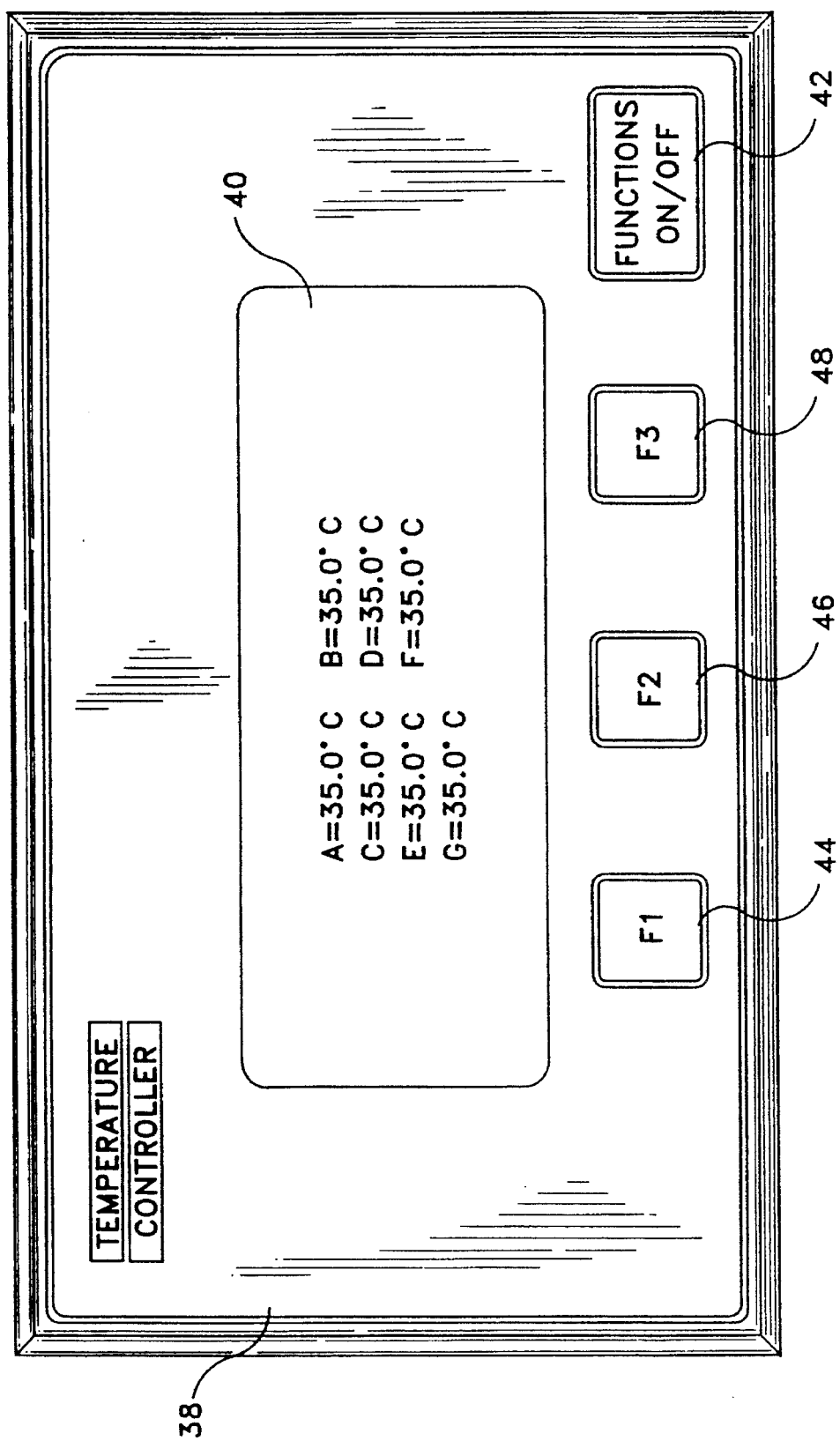
FIG. 2 is an enlarged view of the temperature control panel used in the automated blood culturing system of FIG. 1, illustrating the manner in which the individual loop or rack temperature are displayed.
Figure 3:
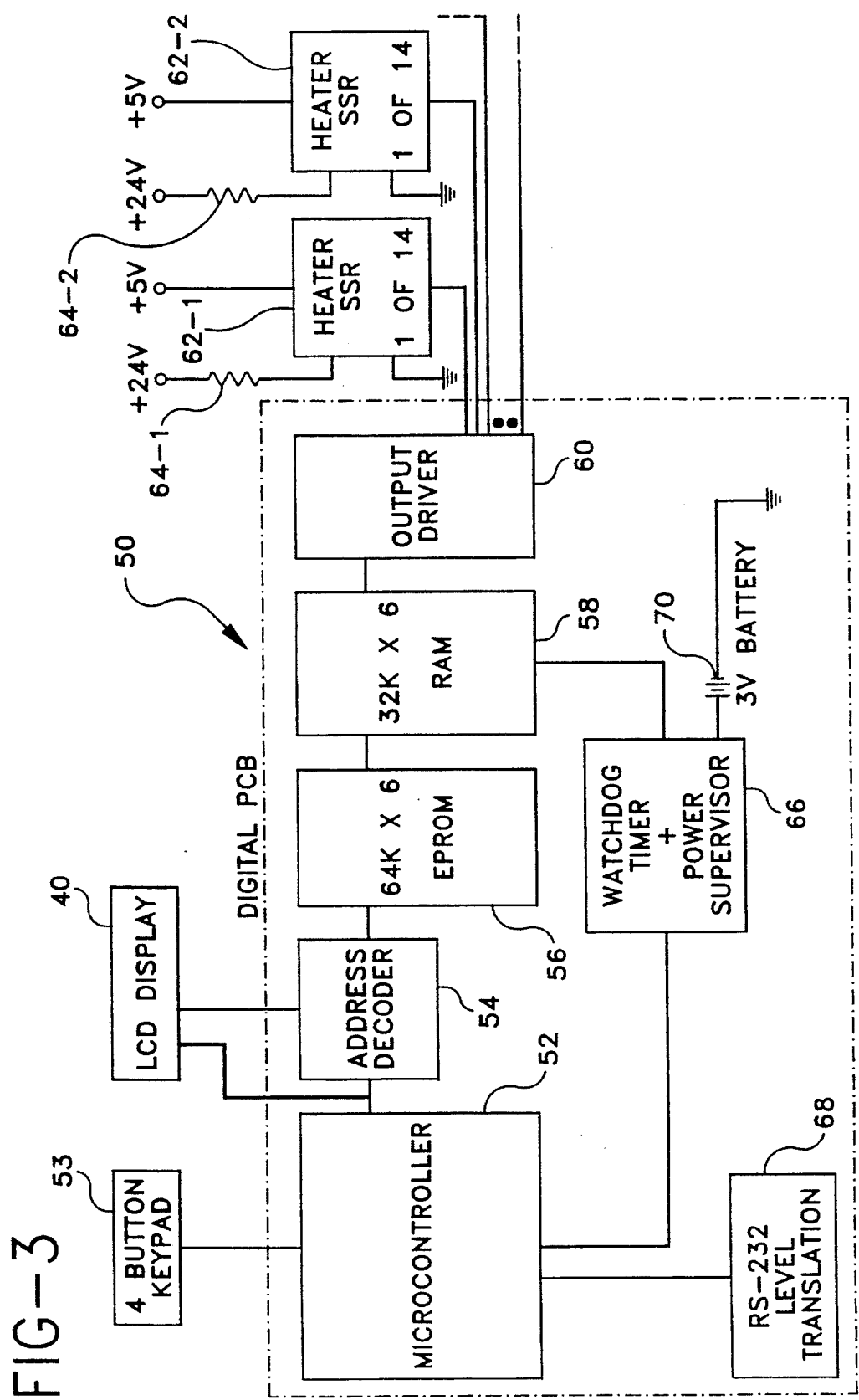
FIG. 3 is a block diagram of a digital circuit board used in a preferred embodiment of a multiple-loop temperature controller in accordance with the present invention, together with certain input and output components which are connected to this board.

The multiple-loop temperature controller which controls the temperature of the individual racks 18 and cabinet interior of FIG. 1 consists of two circuit boards, one designated as a digital board and the other designated as an analog board. A block diagram of the digital board 50 is provided in FIG. 3. In general, the digital board provides all computational and control functions for the temperature controller, and produces output signals which control the heaters for the racks 18 and cabinet interior through solid state relays. The design of the digital board 50 is based on an 8-bit microcontroller 52 which contains a central processing unit, four input-output ports, 256 bytes of random access memory (RAM), an interrupt controller, a serial port, a bus controller, three timer/counters, and a crystal-controlled oscillator. The microcontroller receives inputs from the 4-button keypad 53, consisting of the buttons 42–48 of FIG. 2, and displays temperature readings and other output data on the LCD display 40. An address decoder 54 allows the microcontroller to address the LCD display 40, a 64-kilobyte erasable programmable read-only memory (EPROM) 56, and a 32-kilobyte static random access memory (RAM) 58. The EPROM 56 stores all control programming or firmware for the microcontroller 52 (including temperature measurement, calibration and initialization routines), and the RAM 58 provides storage for setup parameters, temperature loop control parameters and various intermediate values used in calculations. The microcontroller 52 also controls an output driver 60 which operates a number of solid state relays 62, with one relay being provided for each of the racks 18 of FIG. 1 and for the interior of the cabinet 12. (Although the exemplary blood culturing system of FIG. 1 requires only seven relays for the six racks and cabinet interior, the digital board of FIG. 3 provides a total of 14 outputs to allow for use with other systems that may have larger rack capacities.) Each solid state relay is operated by a 5-volt DC source and controls the energization of a heating device 64 associated with the corresponding rack 18 or cabinet interior. The heating devices 64 are preferably resistance heaters powered by 24-volt DC sources as shown, but may comprise other types of heating and/or cooling devices if desired. Examples include thermoelectric heating and cooling elements, fans, and other devices capable of maintaining a desired set point temperature. In operation, the microcontroller 52 operates the output driver 60 and solid state relays 62 in such a manner as to vary the duty cycle of the current delivered to the resistance heating devices 64. This is done in accordance with a proportional integral derivative (PID) control program stored in the EPROM 56, using as inputs the temperature readings obtained from the RTD temperature sensors associated with the racks 18 and cabinet interior of FIG. 1.

The digital board of FIG. 3 also includes a watchdog timer and power supervisor 66, and an RS-232 level translation circuit 68. The watchdog timer and power supervisor 66 functions to reset the microcontroller 52 when power supply interruptions are detected, and also connects a 3-volt lithium battery 70 to the RAM 58 when a power interruption occurs in order to render the RAM nonvolatile. The RS-232 level translation circuit 68 serves as a driver and receiver to allow serial communications to be carried out with external components. The external component may, for example, comprise a personal computer that is used to store time-temperature data or to supervise the operation of the multiple-loop temperature controller. Connections between the analog board of FIG. 3 and the serial board of FIG. 4 are not shown, but will be described in detail in connection with FIGS. 5–7.

Figure 4:
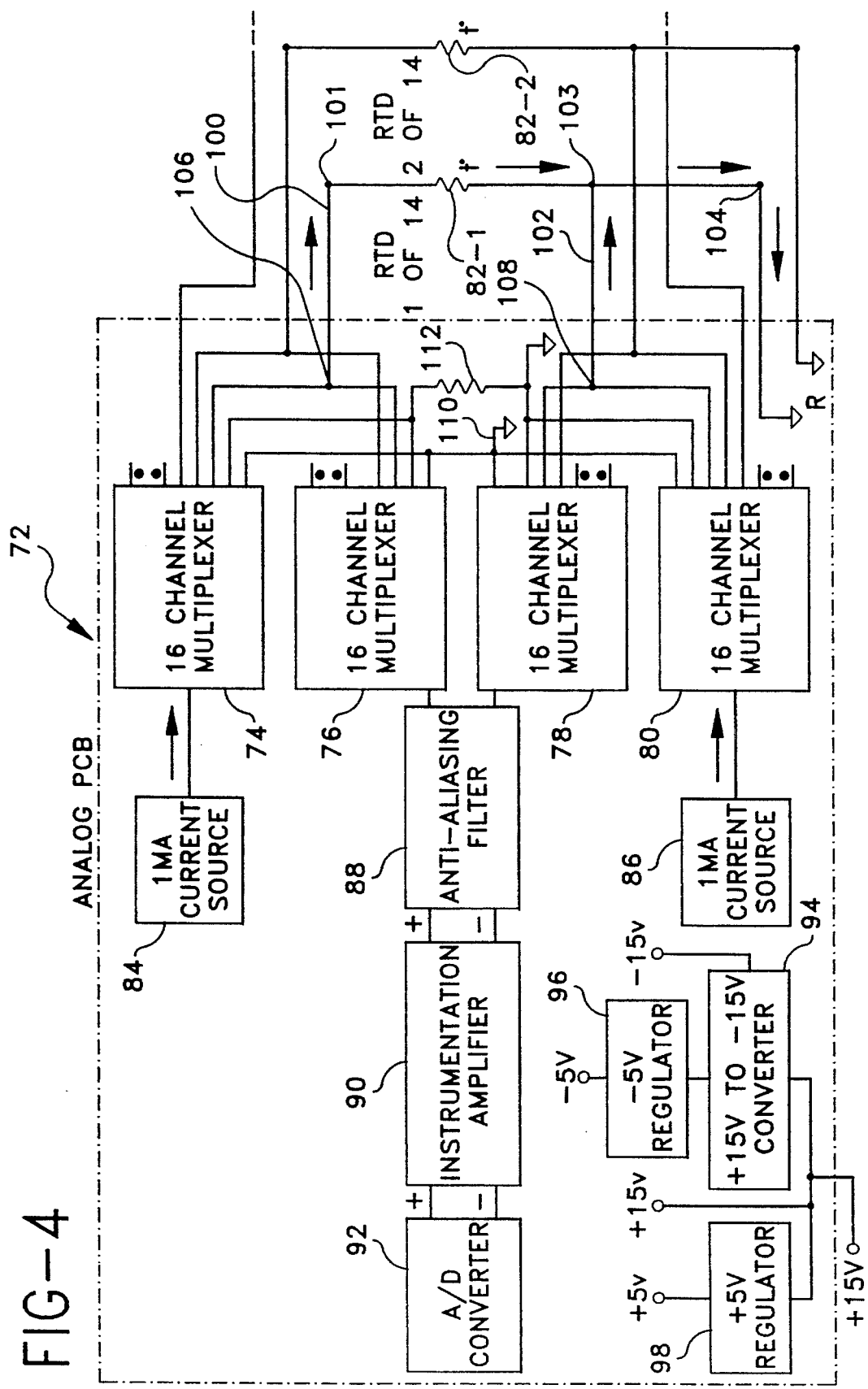
FIG. 4 is a block diagram of an analog circuit board which is used in a preferred embodiment of a multiple-loop temperature controller in accordance with the present invention, together with the resistance temperature devices (RTDs) and calibrating resistors which form the inputs to this board.

Referring now to FIG. 4, the analog board 72 is shown in block diagram form. In general, the analog board 72 provides all analog functions for the multiple-loop temperature controller, including the measurement of output voltages from the RTD temperature sensors and the conversion of these analog voltage levels to digital temperature values. To this end, the analog board 72 includes four 16-channel multiplexers 74, 76, 78 and 80 which are switched or sequenced in synchronism by the microcontroller 52 of FIG. 3. The multiplexers 74 and 80 serve as input multiplexers for applying precise 1-milliampere excitation currents to each of the 3-wire RTD temperature sensors 82 from the identical constant current sources 84 and 86. The multiplexers 76 and 78 serve as output multiplexers for detecting the resulting analog voltages which appear across the RTD temperature sensors 82, and for applying these voltages to a measurement circuit. The measurement circuit comprises an anti-aliasing filter 88, an instrumentation amplifier 90 which operates in a differential mode, and an analog-to-digital (A/D) converter 92.

The analog board 72 also provides all of the DC voltage levels that are required by the components of the digital and analog boards 50 and 72. A converter 94 provides a −15 volt DC output from an external +15 volt DC source (not shown), and a regulator 96 is connected to the output of the converter 94 to provide a regulated −5 volt DC output. An additional regulator 98 is connected to the external +15 volt DC source to provide a regulated +5 volt DC output. Power and data lines connecting the analog board 72 of FIG. 4 to the digital board 50 of FIG. 3 are not shown in FIG. 4.

During each cycle of operation of the multiple-loop temperature controller, the microcontroller 52 of FIG. 3 successively connects each of the RTD temperatures sensors 82 of FIG. 4 to the current sources 84 and 86 and simultaneously to the measurement circuit 88–92 by synchronously controlling the channel switching of the multiplexers 74–80. Thus, for example, a reading from the RTD temperature sensor 82-1 of FIG. 4 is obtained by simultaneously switching the channels of the multiplexers 74 and 80 so that the respective current sources 84 and 86 are coupled to the output leads 100 and 102 which connect the analog board 72 to the RTD sensor 82-1. This results in a current from the current source 84 passing through the lead 100 and positive terminal 101 of the RTD sensor 82-1 to the RTD ground terminal 104, and an identical current passing through the lead 102 and negative RTD terminal 103 to the RTD ground terminal 104. These currents are indicated by the arrows in FIG. 4. An a result of this arrangement, and the fact that the leads 100 and 102 for each RTD sensor are substantially equal to each other length (although not necessarily equal in length to the leads for other RTD sensors), the differential voltage appearing across the nodes 106 and 108 will be equal to the voltage drop across the RTD sensor 82-1 and will not be affected by the voltage drop occurring across the relatively long leads 100 and 102. This differential voltage is applied to the measurement circuit 88–92 by means of the multiplexers 76 and 78, which have been switched by the microcontroller 52 of FIG. 1 simultaneously with the multiplexers 74 and 80 to the channels corresponding to the RTD sensor 82-1. The A/D converter 92 converts the differential analog voltage to a digital value which corresponds to the temperature measured by the RTD sensor 82-1, and this value is applied as an input to the microcontroller 52 of FIG. 3. This process is repeated sequentially for each of the RTD sensors 82 during a complete cycle of operation of the multiple-loop temperature controller. It will be appreciated that the multiplexers 74–80 allow the current sources 84 and 86 and measurement circuit 88–92 to be shared by all of the RTD sensor loops. This greatly reduces the number of components required in the temperature controller, and also eliminates any errors that might otherwise occur due to slight differences among nominally identical, non-shared components.

Calibration of the measurement circuit 88–92 of FIG. 4 is carried out automatically by the microcontroller 52 of FIG. 3 using the ground reference 110 and calibration resistor 112 of FIG. 4. The ground reference 110 provides a zero reference value for the analog voltages from the RTD sensors 82, while the calibration resistor 112 has a resistance value which is equal to a predetermined full scale resistance value of the RTD sensors 82. During each cycle of operation of the multiple-loop temperature controller, either a zero scale calibration operation or a full scale calibration operation is carried out using the ground reference 110 or calibration resistor 112 before any temperature readings are obtained from the RTD sensors 82. Preferably, the zero and full scale calibration operations are performed in an alternating manner during successive cycles of operation of the controller, so that a complete calibration is carried out during every two cycles of operation. Each calibration is carried out by switching the multiplexers 74–80 to connect the ground reference 110 or calibration resistor 112 to the current sources 84 and 86 and simultaneously to the measurement circuit 88–92, in essentially the same manner as the multiplexers are switched to obtain a temperature reading from one of the RTD sensors 82. Taking the zero scale calibration as an example, the multiplexers 74 and 80 are switched to connect the current sources 84 and 86 to the ground reference 110, resulting in an analog voltage representative of a zero scale voltage appearing across the inputs of the multiplexers 76 and 78. The multiplexers 76 and 78 are switched simultaneously with the multiplexers 74 and 80 to apply this analog voltage to the input of the measurement circuit 88–92. The microcontroller 52 of FIG. 3 applies an input signal to the A/D converter 92 of FIG. 4 to indicate that a zero scale calibration operation is to be performed, and the A/D converter 92 responds by defining the analog input voltage at the output of the instrumentation amplifier 90 as the zero scale voltage value for the RTD sensors 82. The same process is repeated during the full scale calibration operation using the calibration resistor 112.

By performing the calibration operations continuously during successive operating cycles of the multiple-loop temperature controller, inaccuracies due to offset voltage error and gain error in the instrumentation amplifier 90 are eliminated, as are errors due to temperature drifts in all of the components of the analog board 72 other than the calibration resistor 112 itself. The calibration resistor 112 is preferably a 0.01% precision resistor with a very low temperature coefficient (about 4 parts per million per degree Celsius), and hence any error contributed by this resistor is minimal. Moreover, since the same multiplexers 74–80 that are used to connect the RTD sensors to the measurement circuit 88–92 during the actual temperature measurement operations are also used to connect the ground reference 110 and calibration resistor 112 to the measurement circuit 88–92 during the zero and full scale calibration operations, any errors contributed by resistive imbalances among the various multiplexers, or by leakage currents within the individual multiplexers (which are generally equal for all channels of a given multiplexer), are automatically cancelled out during the calibration operations.

Figure 5A:
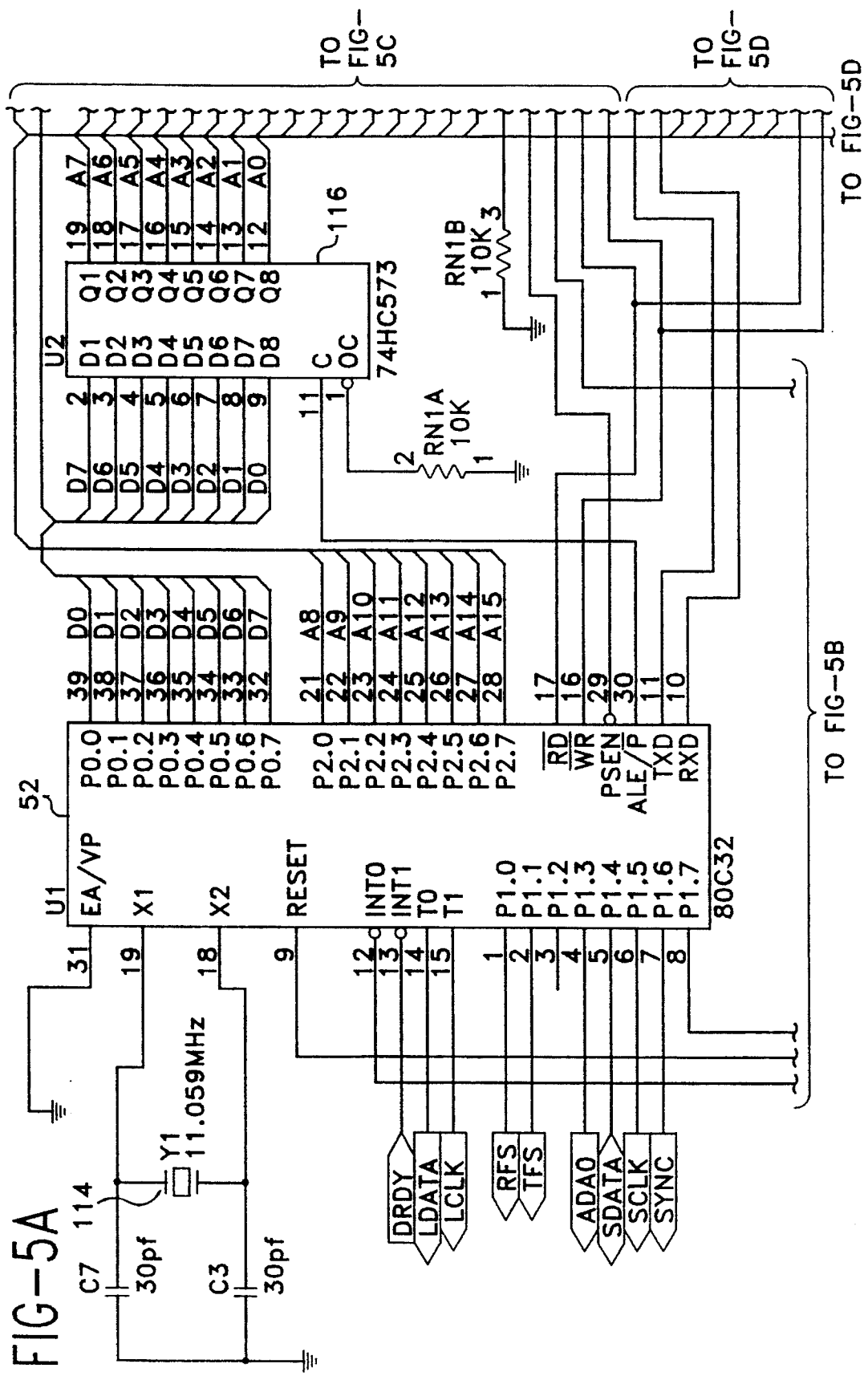
FIGS. 5A through 6C comprise a detailed schematic diagram of the digital circuit board of FIG. 3.
Figure 5B:
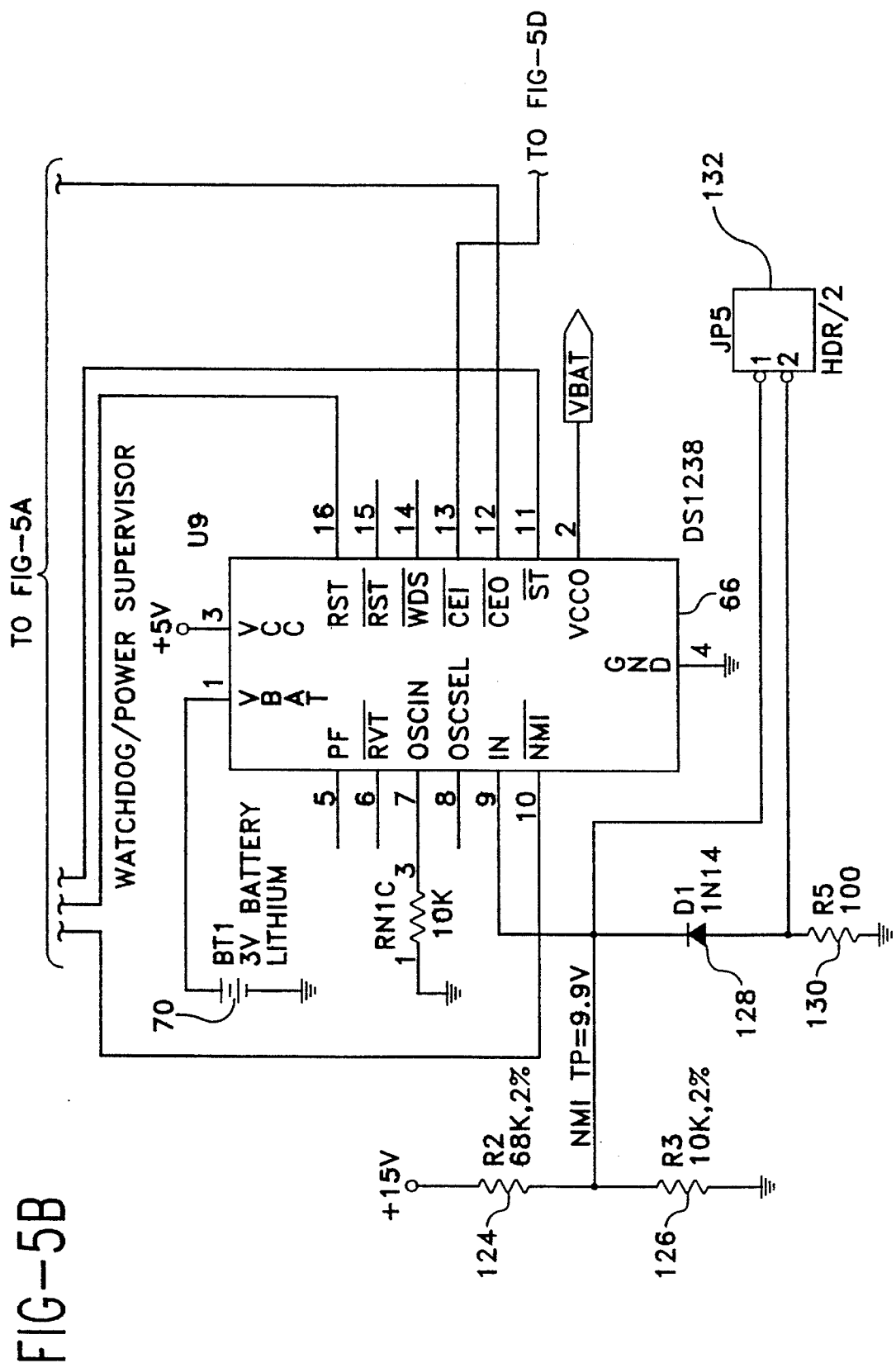
Figure 5C:
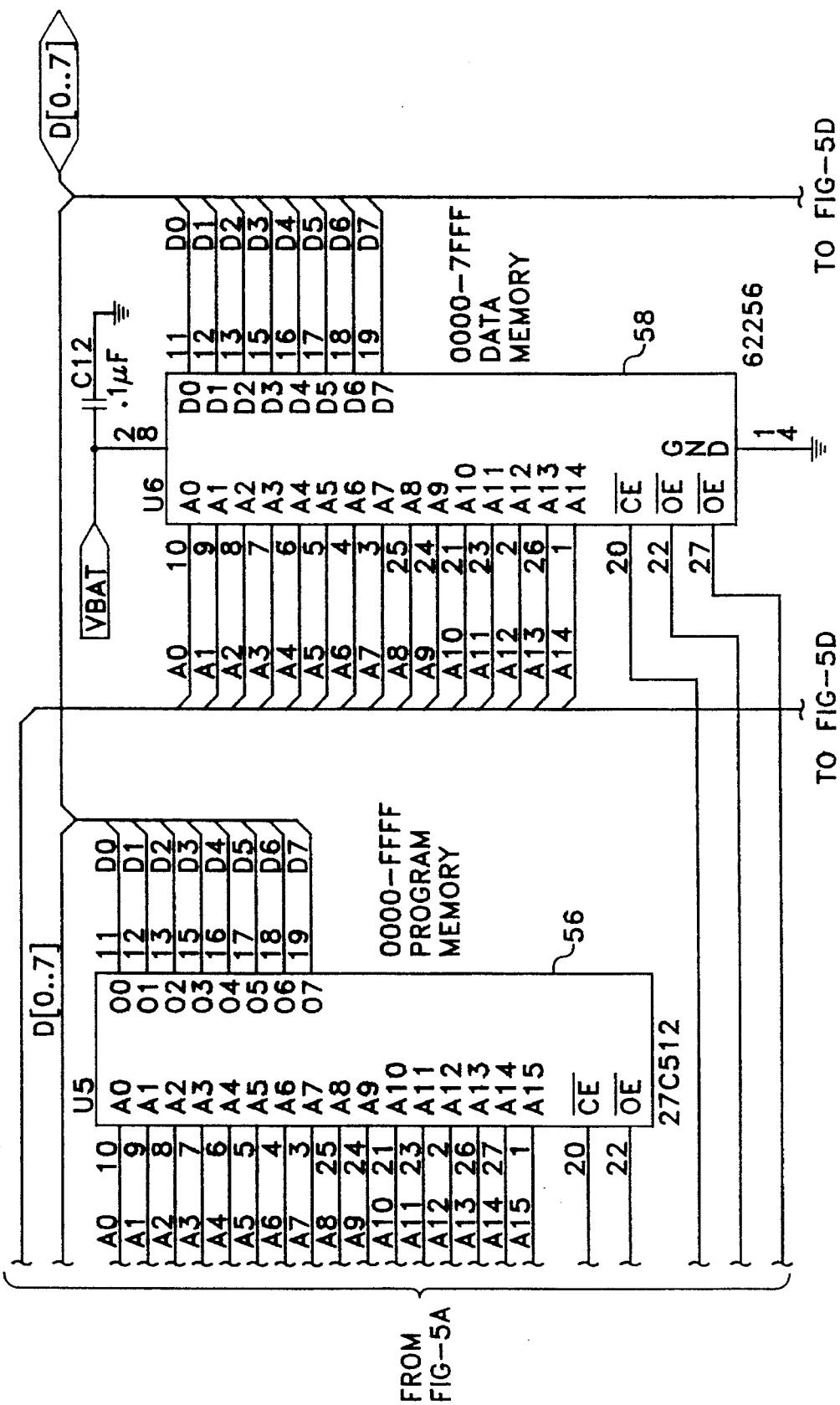
Figure 6B:
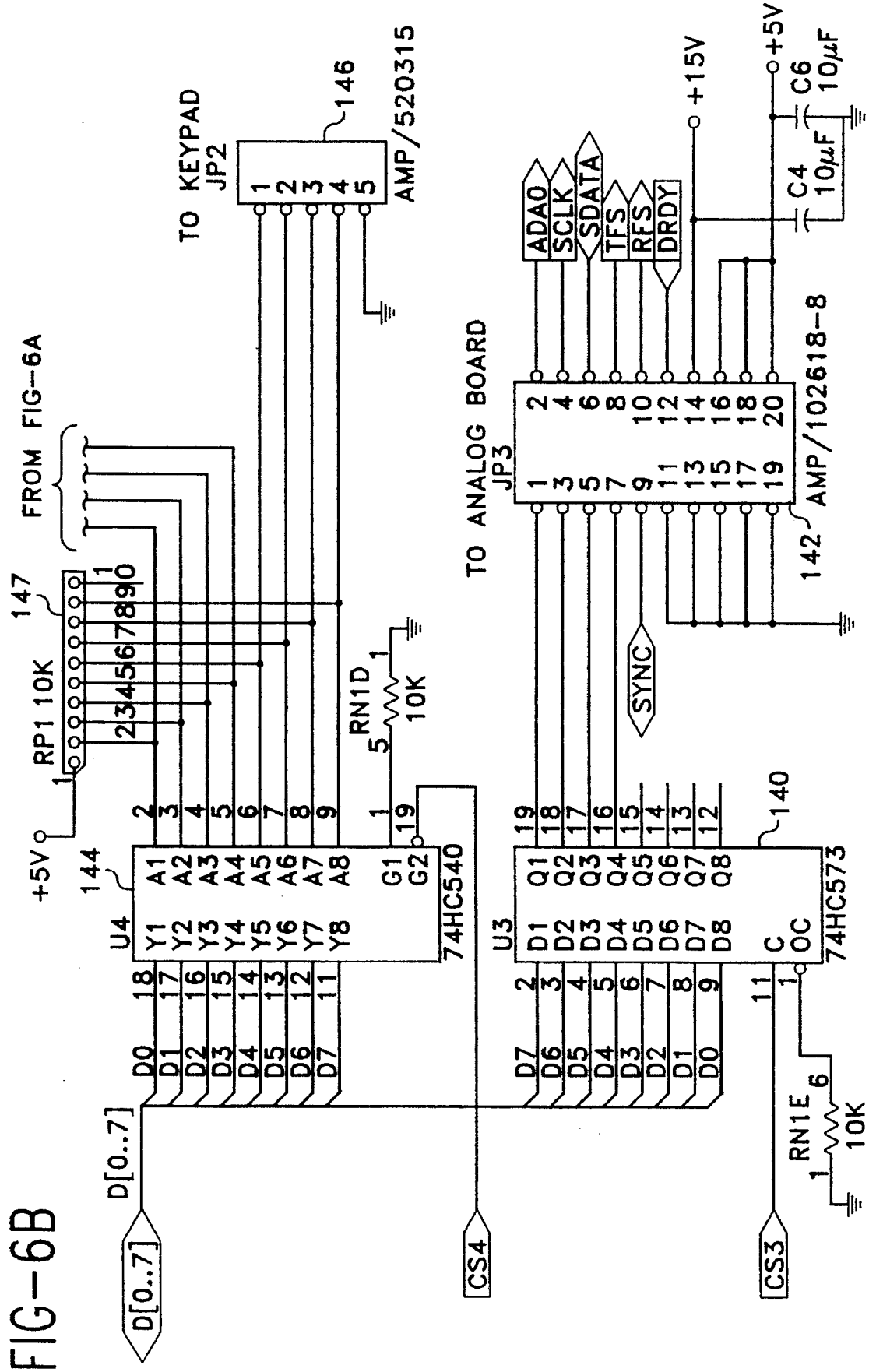

A detailed schematic diagram of the digital board 50 of FIG. 3 is provided in FIGS. 5 and 6. The microcontroller 52 in FIG. 5 preferably comprises an Intel type 80C32 or equivalent 8-bit microcontroller with 256 bytes of internal random access memory (RAM). An external crystal 114 clocks the microcontroller 52 at approximately 11 megahertz. The microcontroller 52 has a RESET input and two interrupt inputs, designated INT0 and INT1, which can trigger interrupts by means of an internal interrupt controller. The microcontroller 52 uses a multiplexed address and data bus, and the ALE (Address Latch Enable) line provides a means for demultiplexing the bus. When the ALE line is high, address bits A0–A7 are present on pins 39–32 of the microcontroller. A transparent latch 116 (type 74HC573) with its clock line tied to the ALE line of the microcontroller 52 demultiplexes the address bits A0–A7. As long as the clock line of the latch 116 is high, data is passed directly from the D1–D8 inputs to the Q1–Q8 outputs of the latch. When the ALE output of the microcontroller 52 returns to a low logic level, the present address is latched on the Q1–Q8 outputs of the latch 116. Address lines A9–A15 of the microcontroller 52 are not multiplexed, and therefore require no additional latch.

Address decoding for the microcontroller 52 is provided by a type 16V8 GAL (Generic Array Logic) device indicated at 54 in FIG. 5. The GAL device provides memory mapped addresses to the latch 140, static RAM 58 and input buffer 144 of FIG. 5, and also to the LCD display 40 of FIG. 3. A header 118 provides connection points for output lines to the LCD display 40 from the data lines of the microcontroller 52. A potentiometer 120 is provided to allow the contrast of the LCD display 40 to be adjusted, and backlighting for the LCD display 40 is provided by means of a +5 volt DC source and a current limiting resistor 122.

The watchdog timer and power supervisor 66 in FIG. 5 preferably comprises a type DS1238 device which also incorporates a static RAM battery switch in a single dual-in-line package (DIP). This device will reset the microcontroller 52 if either of two conditions is met. The first condition is that the watchdog timer strobe (ST) line is not pulsed low at a minimum rate of once each 170 milliseconds beginning 2.7 seconds after a reset. The second condition is that the +5 volt DC logic supply voltage drops to a nominal value of 4.37 volts. In addition to the reset function, the watchdog timer and power supervisor 66 provides the necessary circuitry to convert a standard static RAM into nonvolatile memory. When the +5 volt DC logic supply drops below the 4.37 volt nominal value, indicating an incipient power failure or interruption, the device 66 disconnects the +5 volt DC power supply from the VCCO line which is connected to the VCC line of the static RAM 58. At the same time, the device 66 reconnects the VCCO line to the VBAT line of the device 66. This line is coupled to a 3-volt lithium battery 70, and hence the VCCO line of the static RAM 58 is supplied with a voltage level of 3 volts minus one diode drop (approximately 0.7 volt, attributable to the circuitry within the watchdog timer 66). The chip enable output (CEO) line of the watchdog timer and power supervisor 66 is also brought to a high logic level to provide write protection for the static RAM 58 during the power failure or interruption. The device 66 also provides an early power failure detection output line (NMI), which transitions to a low logic level when the +15 volt DC main supply voltage drops below a predetermined level (preferably 9.9 volts). This level can be set by changing the voltage divider resistors 124 and 126. The output line NMI is connected to the interrupt input INT0 of the microcontroller 52 to trigger an interrupt routine which saves certain data (e.g., current PID values, output duty cycle, and other parameters needed to initialize the microcontroller) when a power failure or interruption occurs. To reduce battery drain during extended periods of non-use, the watchdog timer and power supervisor 66 can be placed into what is known as a freshness mode, in which the 3-volt lithium battery 70 is electrically disconnected. A series of three negative-going pulses 1 millisecond wide with an amplitude of −3 volts will place the device 66 into the freshness mode. A diode 128 and resistor 130 prevent negative-going noise spikes from enabling this mode inadvertently. Entry into the freshness mode can be triggered by biasing pin 2 of the header 132 with −3 volts DC while pulsing pin 1 from 0 to −3 volts.

With continued reference to FIG. 5, program memory (firmware) for the microcontroller 52 is stored in the EPROM 56, which is preferably a type 27C512 device with a storage capacity of 64 kilobytes by 8 bits wide. Program memory is selected by the program storage enable (PSEN) line of the microcontroller 52. The PSEN line goes low only when program memory is being accessed in the address range of 0000H-FFFFH. The static RAM 58 is preferably a type 62256 device providing 32 kilobytes by 8 bits of storage, which can be accessed by the microcontroller 52 using the address range 0000H-7FFFH. The static RAM 58 is rendered nonvolatile by the watchdog timer and power supervisor 66 and the lithium battery 70, as described previously.

The output driver 60 shown in FIG. 6 preferably comprises a type MM5451 device which provides 34 open collector outputs. These outputs (designated OUT1–OUT32, GALARM, and GALARM1) are connected to a header 134 and are used as pre-drivers for the 14 resistance heating devices 64 of FIG. 3 and for 20 user-configurable outputs. The BC line of the output driver 60 sets the maximum current level that will be supplied to each of the 34 outputs. The current supplied to the outputs is typically 20 times the current entering the output driver 60 on the BC line. A resistor 136 is used to set the current into the BC line to a minimum of 1.5 milliamperes. Therefore, the current that can be supplied to any one output is at least 30 milliamperes. The operation of the output driver 60 can be compared to that of a 35-bit shift register. Preceded by a single start bit, data to be sent to the output is presented on the DIN line, and the CLK line is then brought low repeatedly to shift in each of the 35 bits. On the 36th clock pulse, the 35 bits shifted into the output driver 60 are latched to the outputs and the internal shift register is reset to prepare for the next load cycle.

With continued reference to FIG. 6, the RS-232 level translation circuit 68 is preferably a type MAX233 device with its inputs and outputs connected as shown. The device 68 provides the necessary voltage level translation to perform RS-232 serial communications. It incorporates charge pump voltage converters which convert the +5 volt DC input power to the +10 volt DC and −10 volt DC levels needed to generate RS-232 outputs. Both TTL and RS-232 voltage levels are supplied to the header 134. The TTL levels are not required for the circuit shown, but allow for optional connections between the digital board 50 and the TTL-level circuitry (not shown) which is used to control the testing functions at the racks 18 and vials 20 of FIG. 1 and to send data to the host or system computer 26 of FIG. 1. A shorting jumper is installed on the header 138 in FIG. 6 when RS-232 communications are being used and no jumper is used when TTL-level communications are being used.

Latched outputs to the analog board 72 are provided by means of a type 74HC573 transparent latch 140, also shown in FIG. 6. This allows the digital board 50 to select the appropriate channels of the multiplexers 74–80 of FIG. 4 during temperature measurement and calibration operations. Connections to the analog board 72, including the channel selection bits MUXA0–MUXA3 which are used to switch the multiplexers 74–80, are made through a header 142. All of the multiplexers 74–80 are switched simultaneously to the same channel (1 through 16) in accordance with the channel selection bits MUXA0–MUXA3, which can have sixteen different values between 0000 and 1111. Inputs to the microcontroller 52 of FIG. 5 from the keypad 53 are provided by a type 74HC540 input buffer which is indicated at 144 in FIG. 6. Eight-bit data presented at the inputs A1–A8 of the input buffer 144 are transferred to the outputs Y1–Y8 when the line G2 is at a low logic level. A header 146 connects the inputs A5–A8 of the input buffer 144 to the 4-button keypad 53 of FIG. 3. A 10-Kilohm resistor network 147 maintains the inputs to the input buffer 144 at a high logic level when no connections to these lines are made.

Figure 7A:
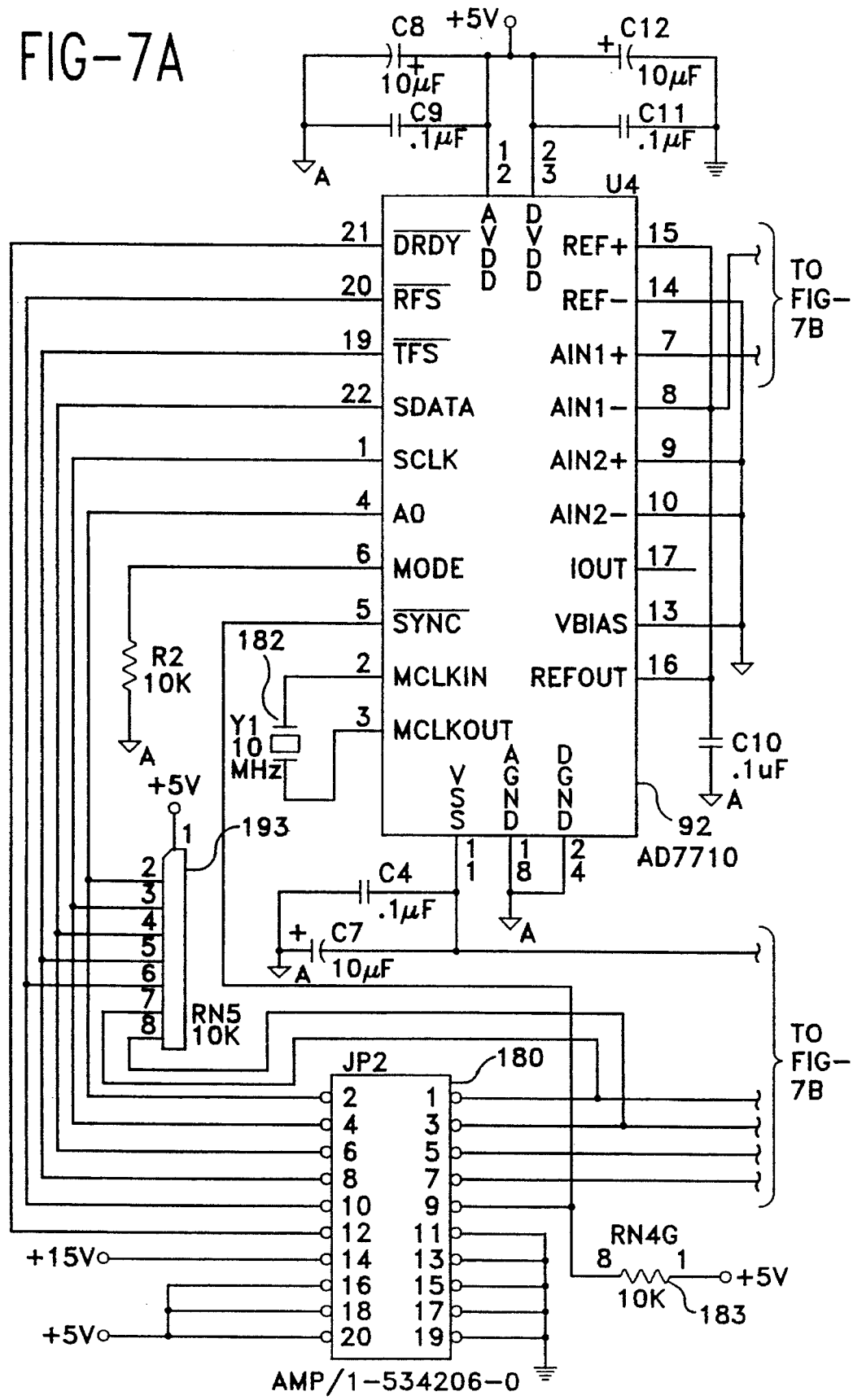
Figure 7F:
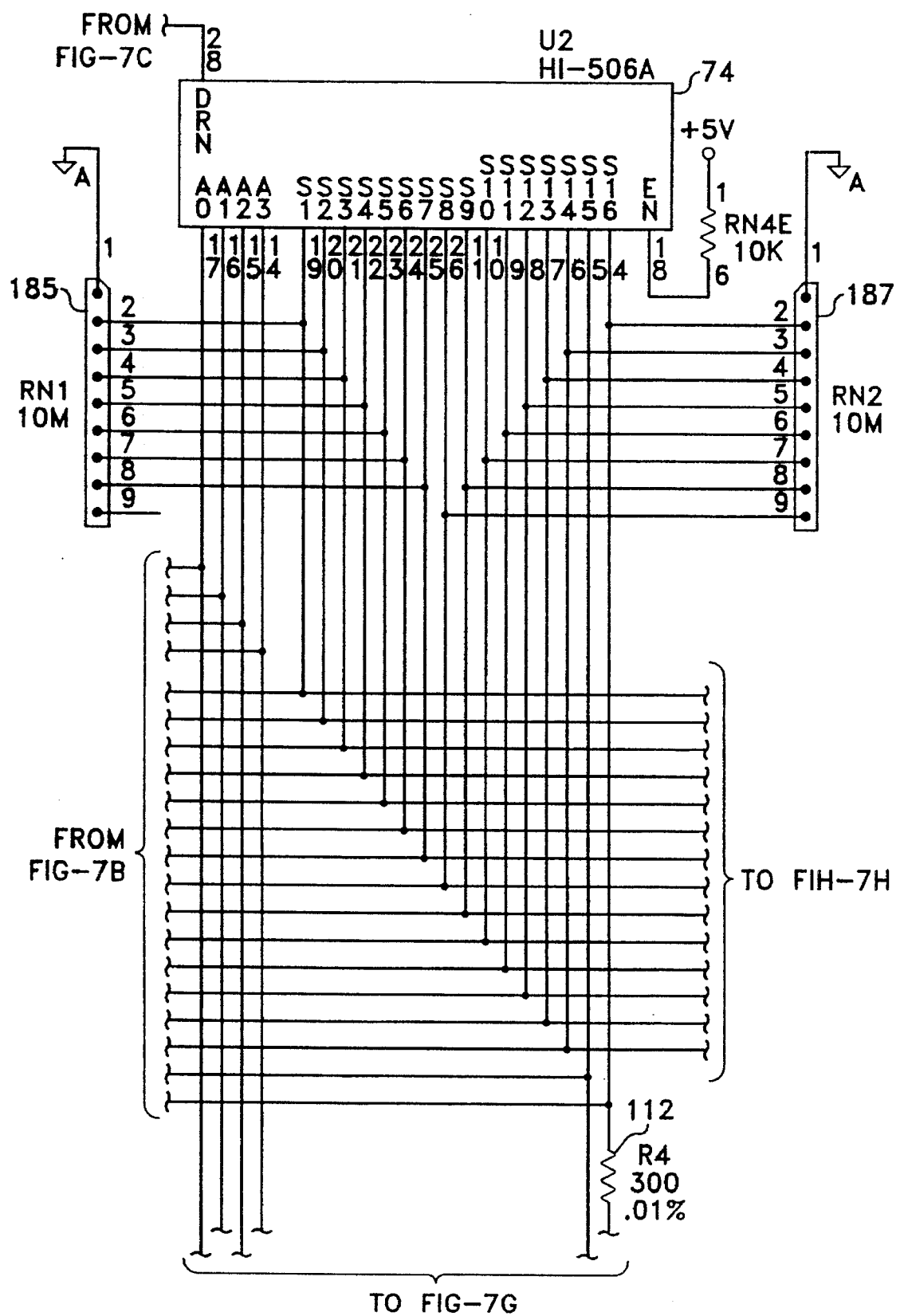
Figure 7G:
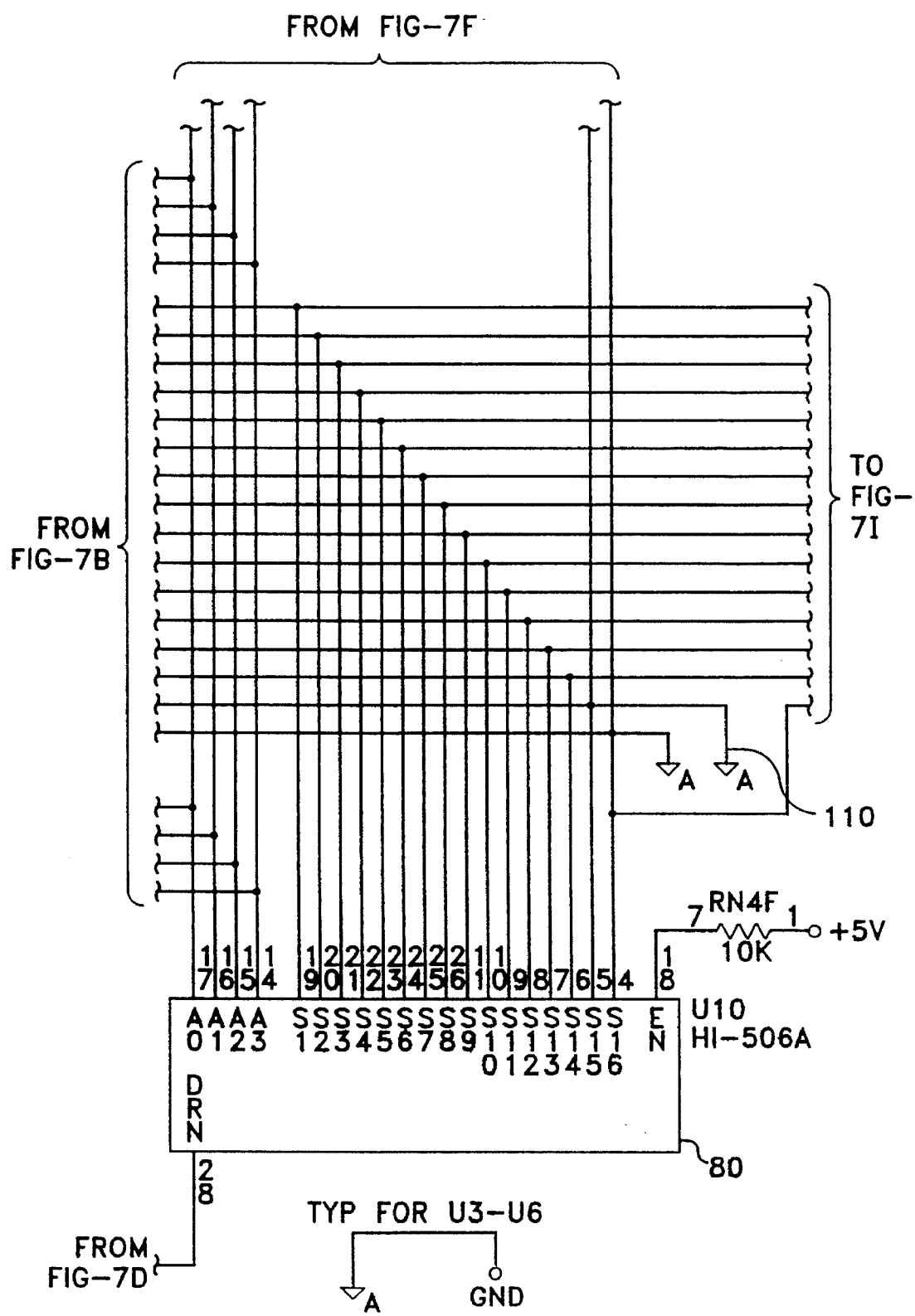

FIG. 7 is a detailed schematic diagram of the analog board 72 shown in FIG. 4. Incoming +15 volt power is filtered by a ferrite bead 148 and capacitors 150 and 152. The ferrite bead 148 attenuates incoming RF noise above 1 megahertz. The capacitor 150 filters low frequency noise and transients, while the capacitor 152 filters high frequency noise and transients. A Zener diode 154 acts as a transient voltage suppressor to shunt all voltage transients above 20 volts to ground, and also provides reversed polarity input voltage protection. The filtered +15 volt power is applied to the input of the +5 volt regulator 98, which preferably consists of a Type LM340T-5 three-terminal linear regulator. This device regulates the incoming +15 volt supply voltage to produce a regulated output voltage of +5 volts DC for the A/D converter 92 and for the digital logic devices on the digital board 50. The +15 volt power supply input is also connected to the input of the converter 94, which produces −15 volts DC at its output. The converter 94 is preferably a Type LT1054 switched capacitor voltage converter. Any voltage change imposed on the +15 volt power supply voltage will be tracked by the output of the converter 94. The converter output is supplied to the instrumentation amplifier 90, the amplifiers 156 and 158 used in the current sources 84 and 86, and the multiplexers 74–80. The −15 volt output from the converter 94 is also applied to the input of the −5 volt regulator 96, which preferably comprises a Type LM79L05 three-terminal low power regulator. This device regulates the −15 volt DC output from the converter 94 to produce a −5 volt DC output which is used as a negative clamp voltage for the AIN+ input line of the A/D converter 92, and as a −5 volt DC supply for the VSS pin of the A/D converter 92. A 5.6 volt Zener diode 160 provides a low impedance path for a Shottky diode 162, and prevents the output of the regulator 96 from becoming unregulated when a negative rail excursion occurs at the output of the instrumentation amplifier 90.

With further reference to FIG. 7, the precision 1-milliampere current sources 84 and 86 each consist of a precision 5-volt DC voltage source 153, 155 with its output coupled to a Type AD708 operational amplifier 156, 158 through a 5 kilohm resistor 166, 168. The two current sources 84 and 86 are switched through two Type HI-506A 16-channel multiplexers 74 and 80 to provide 1-milliampere excitation currents to selected ones of the 14 3-wire RTD sensors 82. Two current sources 84 and 86 are used in order to null out any error caused by the wire runs leading to the RTD sensors, as described previously. The multiplexers 76 and 78, which are also preferably Type HI-506A 16-channel multiplexers, switch the analog RTD voltage outputs to the input of the measurement circuit comprising the anti-aliasing filter 88, instrumentation amplifier 90 and A/D converter 92.

The anti-aliasing filter 88 is formed by resistors 170 and 172 and capacitor 174. These components form a single pole, low pass anti-aliasing filter with a −3 dB frequency of 796 Hertz. This filter is used to prevent the A/D converter 92 from aliasing (i.e., measuring noise occurring at the sampling rate rather than the input voltage from the RTD sensor) at frequencies above 40 kilohertz and harmonics thereof. The digital filter in the A/D converter 92 prevents aliasing at frequencies below 40 kilohertz. The resistors 170, 172 and capacitors 176, 178 form two single pole, low pass filters with a −3 dB frequency of 339 kilohertz. These filters are used to filter out any common mode noise above 339 kilohertz imposed on both the inverting and noninverting inputs of the instrumentation amplifier 90. Common mode noise below 339 kilohertz is reduced by the instrumentation amplifier 90. At 60 Hertz, the instrumentation amplifier 90 has a common mode rejection ratio of greater than 96 dB. The instrumentation amplifier 90 is preferably a type INA114 differential amplifier with a gain of 8.34. The amplifier 90 prevents a large capacitance from being applied to the input of the A/D converter 92.

The A/D converter 92 is preferably an Analog Devices type AD7710 24-bit sigma delta (charge balancing) analog-to-digital converter. The analog voltage developed across each RTD sensor (or, in the case of calibration, the voltage developed across the ground reference 110 or calibration resistor 112) is multiplied by a factor of 8.34, which is the gain of the differential amplifier 90, and is applied across the input lines AIN1+ and AIN1− of the A/D converter 92. A 24-bit digital temperature value appears at the output SDATA of the A/D converter 92, and this value is read serially by the microcontroller 52 on the digital board by pulsing the SCLK line. A header 180 provides connection points for power and data lines which connect the analog board 72 to the digital board 50. The A/D converter 92 contains a programmable digital filter with a $(\sin x/x)^3$ response. The first filter notch is programmed at 50 Hertz or 60 Hertz, depending upon the A/C line frequency, and the attenuation achieved at these lines frequencies is greater than 150 dB. Internal clocking for the A/D converter is provided by an external crystal 182 which oscillates at 10 megahertz. Resistor networks 183 and 193 comprising 10-Kilohm resistors provide a current path for the otherwise floating inputs of the A/D converter 92 and multiplexers 74–80 when the analog board 72 is not connected to the digital board 50. Additional resistor networks 185, 187, 189 and 191 comprising 10-megohm resistors are used to provide a current path to ground for all unused RTD inputs.

As described previously, calibration of the multiple-loop temperature controller is a two-step process. A zero scale calibration is performed first, followed by a full scale calibration. The temperature controller operates at a 14 loop per second measurement rate, and interleaves zero and full scale calibrations during alternating cycles to obtain a system calibration rate of once every two seconds. Calibration is achieved by using the system calibration mode of the A/D converter 92. For zero scale calibration, the multiplexers 74–80 are switched to channel 15, which connects the ground reference 110 to the 1-milliampere current sources 84, 86 and to the input of the instrumentation amplifier 90. A zero scale calibration command is then sent to the A/D converter 92 using the input lines TFS, SDATA, SCLK and A0. Full scale calibration is performed by switching the multiplexers to channel 16, which connects the precision 300 ohm calibration resistor 112 to the current sources 84, 86 and amplifier 90. A full scale calibration command is then sent to the A/D converter using the same input lines mentioned previously. The full scale voltage developed across the resistor 112 is 300 millivolts, which is amplified by the gain factor of 8.34 of the amplifier 90 to achieve a full scale voltage of 2.50 volts at the AIN+ input of the A/D converter 92.

A header 186 provides connection points for the leads which connect the analog board 72 to the 3-wire RTD sensors 82 of FIG. 4. For the RTD sensor 82-1, pin 1 of header 186 is connected to the positive terminal of the RTD sensor, pin 2 of the header 186 is connected to the negative terminal of the RTD sensor, and pin 5 of the header 186 is connected to the ground terminal of the RTD sensor. The corresponding pin assignments for RTD sensor 82-2 are 3, 4 and 6, and for the succeeding RTD sensors the pin assignments are 7, 8 and 11; 9, 10 and 12; and so on. Kelvin connections are made at the connector pins of the header 186 to eliminate any resistive errors caused by the conductors leading to and from the multiplexers 74–80.

Figure 8A:
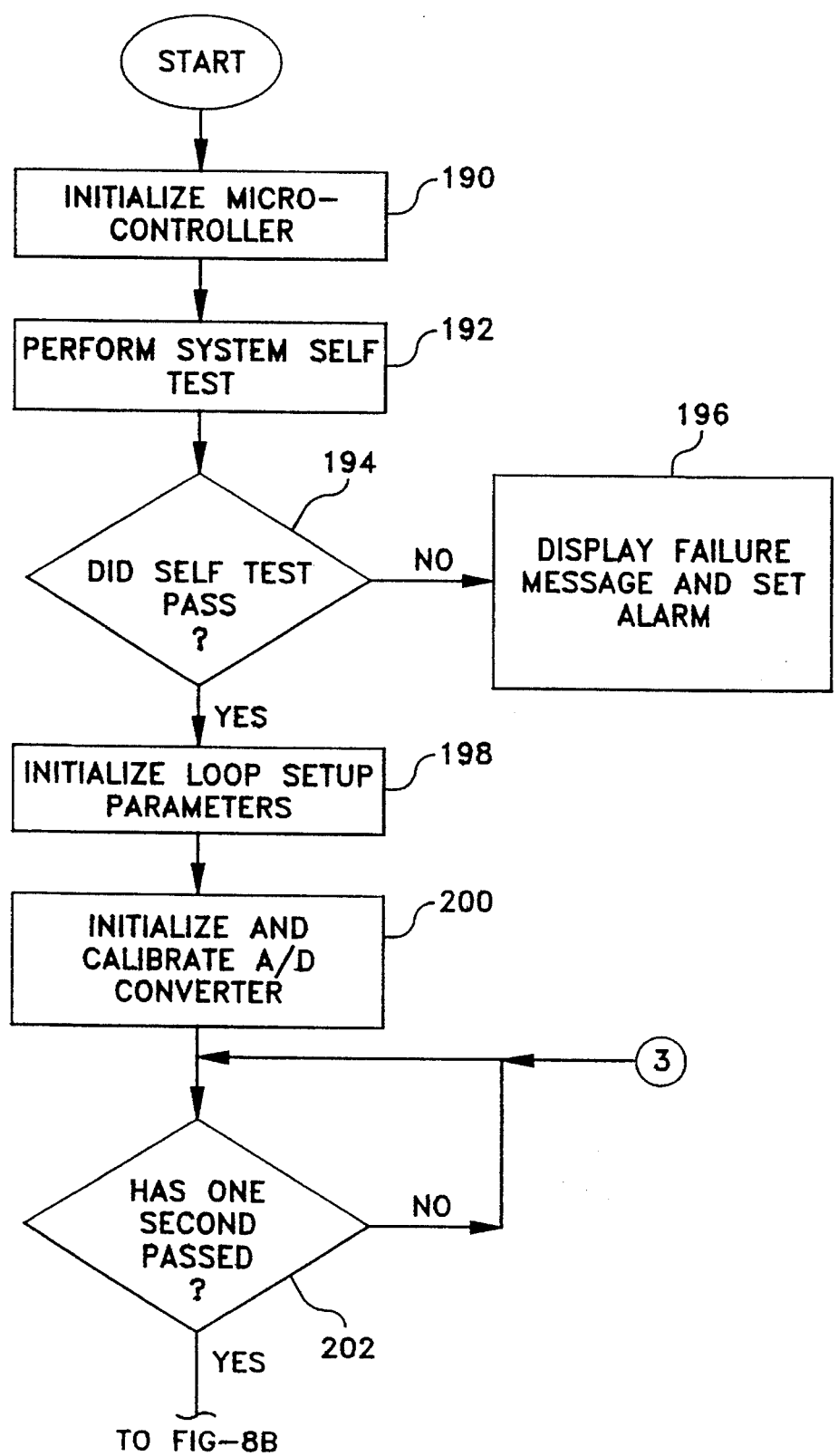
Figure 8C:
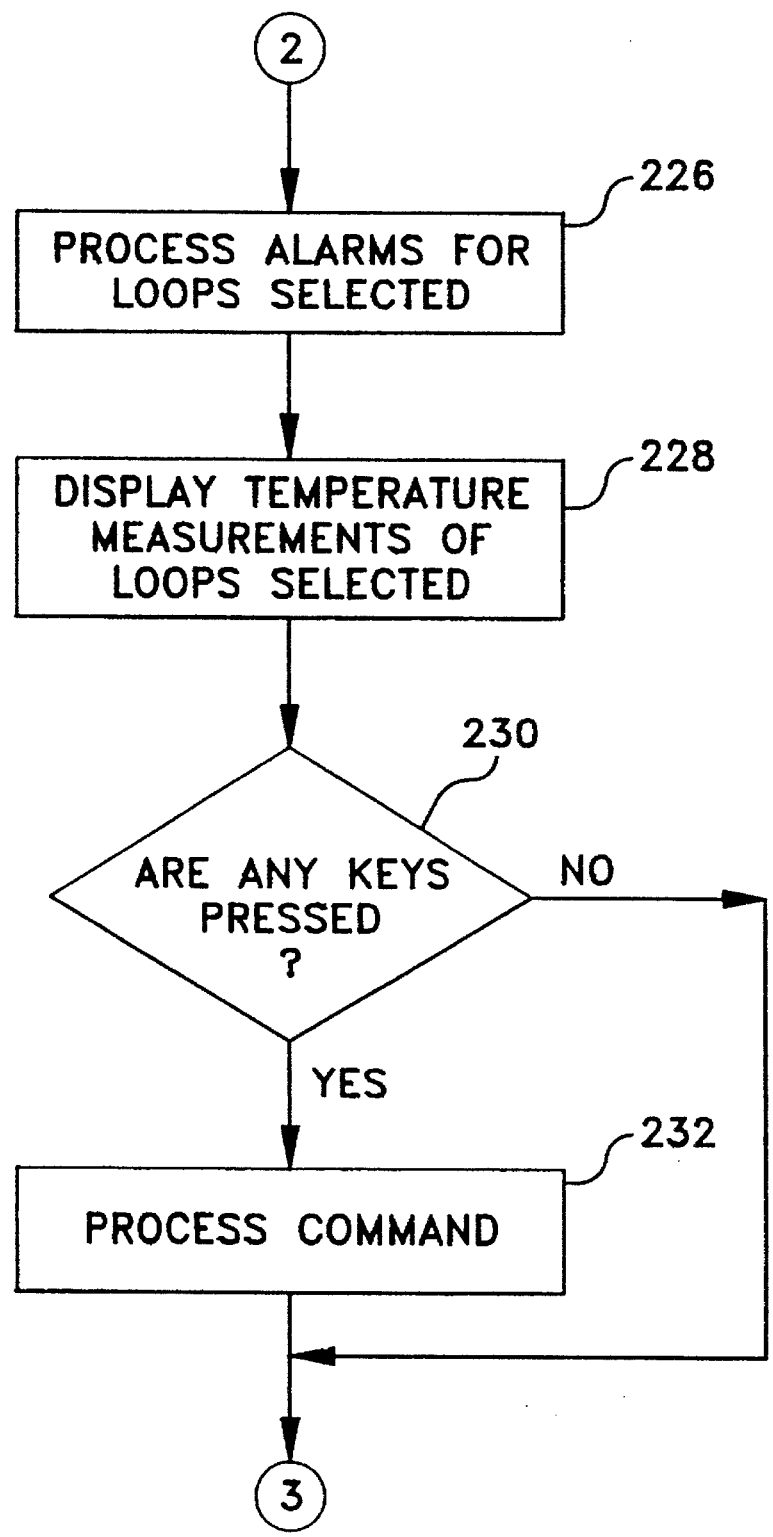

FIG. 8 is a flow chart of a program routine which is carried out by the microcontroller 52 of FIGS. 3 and 5 in order to perform temperature measurement and calibration operations. Each pass through the program routine of FIG. 8 comprises a single cycle of operation of the multiple loop temperature controller, during which temperature measurements are obtained successively from all 14 RTD sensors 82 and a calibration operation (either zero scale or full scale) is performed. In block 190, the program routine begins by initializing the microcontroller 52. This involves initializing various timers and software flags, initializing the output driver 60 and latch 140, and initializing the LCD display 40. The microcontroller then proceeds to block 192, where a system self-test if performed by computing an EPROM checksum and reading and writing test values to the RAM 58. In decision block 194, a determination is made of whether the system self-test has been passed. If not, the microcontroller proceeds to block 196 and displays a failure message on the LCD display 40. The alarm outputs GALARM and GALARM1 of the output driver 60 in FIG. 6 are also set in this block, and an error signal is provided to the system computer 26 of FIG. 1. Processing then stops until the error condition is corrected and the microcontroller is re-initialized. If the system self-test is passed in block 194, the microcontroller proceeds to block 198 and initializes certain loop setup parameters needed for the PID algorithm, including temperature set point values, integration and derivative times, and duty cycle factors. After the-loop setup parameters have been initialized, the microprocessor proceeds to block 200 and performs an initialization and startup calibration of the A/D converter 92. The startup calibration consists of zero and full scale calibrations carried out using the ground reference 110 and calibrating resistor 112 in the manner described previously.

After the initialization and startup calibration of the A/D converter 92 is completed in block 200, the microcontroller enters a repeating program loop which is executed once during each cycle of operation of the temperature controller. In decision block 202, the microcontroller determines whether one second has elapsed since the last operating cycle was completed. If not, the test in block 202 is repeated until the one-second period has elapsed. When this test is satisfied, the microcontroller proceeds to a further decision block 204 and determines whether a zero calibration software flag has been set. If so, a zero scale calibration operation is performed as indicated in block 206, and the zero calibration flag is then cleared as indicated in block 208. If the zero calibration flag is found not to have been set in decision block 204, the microcontroller proceeds instead to block 210 and performs a full scale calibration. When the full scale calibration is complete, the zero calibration flag is set as indicated in block 212. Thus, it will be appreciated that the zero calibration flag is alternately set and cleared during each pass through the program routine of FIG. 8. As a result, either a zero scale calibration or a full scale calibration will be performed during each operating cycle of the temperature controller, and the zero and full scale calibration operations will alternate during successive operating cycles.

After the zero or full scale calibration operation has been completed, and the zero calibration flag has either been cleared or set, the microcontroller proceeds to block 214 and causes the A/D converter 92 to read the analog voltage at the output of the instrumentation amplifier 90. During the first pass through the program loop which begins with the block 214 (i.e., at the beginning of each operating cycle of the temperature controller), this analog voltage will correspond to the temperature reading from the first RTD sensor 82-1. In block 216, the microcontroller 52 converts the digital output value from the A/D converter 92 to a temperature value in accordance with a known RTD curve. In block 218, the microcontroller uses this value to execute the PID algorithm in accordance with a control program stored in the EPROM 56, in order to determine whether any change is needed in the duty cycle of the power delivered to the corresponding resistance heating device 64 to maintain the desired set point temperature at this sensor location. This calculation is carried out in accordance with a known parallel velocity PID algorithm having the following form:

$$M_k = M_{k-1} + \Delta M_k$$

where $$\Delta M_k = K_c [E_k - E_{k-1} + (T/T_I) E_k + B_k]$$

and $$B_k = \frac{\alpha T_D}{T + \alpha T_D} B_{k-1} - \frac{T_D}{T + \alpha T_D} (C_k - 2C_{k-1} + C_{k-2})$$

In this formula, $M_k$ is the output duty cycle (0 to 100%), $K_{k-1}$ is the output duty cycle during the previous sample or cycle, $\Delta M_k$ is the required change in the output duty cycle, $K_c$ is the gain, $E_k$ is equal to the current error value, $E_{k-1}$ is equal to the previous error value, T is equal to the sampling interval (1 per second in the illustrated embodiment), $T_I$ is equal to the desired integration time, $\alpha$ is equal to the derivative filter value, $T_D$ is equal to the desired derivative time, $C_k$ is equal to the current temperature reading, $C_{k-1}$ is equal to the previous temperature reading, $C_{k-2}$ is equal to the temperature reading two cycles previously, and k is the cycle or sample number. Further details concerning the PID algorithm can be found in a text by Armando B. Corripio entitled *Tuning of Industrial Control Systems* (Instrument Society of America, 1990), at pages 114 and 115, incorporated herein by reference.

Following completion of the PID algorithm in block 218, the microcontroller proceeds to block 220 and updates the output duty cycle (on time) of the resistance heating device corresponding to the specific RTD sensor whose temperature reading was used in the algorithm. Taking the example of the first RTD sensor 82-1, this will involve controlling the duty cycle of the current supplied by the output driver 60 to the solid state relay 62-1, which will in turn control the duty cycle of the current delivered to the corresponding resistance heating device 64-1. By controlling the duty cycle of the resistance heating device 64-1, the amount of heat produced by the resistance heating device is increased or decreased by the amount required to maintain the desired temperature set point at the location of the corresponding RTD temperature sensor 82-1. In the preferred embodiment, duty cycle changes are made in increments equal to the reciprocal of the AC line frequency in use (i.e., 16.6 milliseconds for 60 Hertz or 20 milliseconds for 50 Hertz). This allows the resistance heating devices 64 to be powered by the AC line current if desired, since in that case the maximum switching rate of the solid state relays 62 will be dictated by the line frequency. However, when the resistance heating devices 64 are supplied from a 24 volt DC power source, as in the illustrated embodiment, the duty cycle increments can be made shorter if desired.

After the output duty cycle of the heater current has been updated in block 220, the microcontroller proceeds to decision block 222 and determines whether all 14 temperature loops have been processed. If not, the microcontroller proceeds to block 224 and increments a software counter whose value corresponds to the number of the current temperature loop, and returns to block 214. The microcontroller then switches the multiplexers 74–80 to the next channel and repeats the temperature measurement, PID calculation and duty cycle update operations for the next RTD sensor 82-2 and resistance heating device 64-2.

The program loop consisting of blocks 214 through 224 is repeated until all 14 loops have been processed, at which point the determination made in decision block 222 will produce a positive result. At this point, the microcontroller proceeds to block 226 and processes any under-temperature or over-temperature alarms which may have occurred in any of the temperature loops. If an alarm has occurred, an output is displayed by the system computer 26 and LCD display 40 of FIG. 1. In block 228, the microcontroller updates the temperature values displayed by the LCD display 40 to reflect the most recent values measured. If fewer than all 14 available temperature loops are being used in a particular application of the multiple-loop temperature controller, the functions performed in blocks 214–224, 226 and 228 are carried out only for the loops which are actually being used. The number of working loops (up to a maximum of 14) may be set in the firmware stored in the EPROM 56 of FIG. 3, or may be selected by the user through the keypad 53. If the LCD display 40 of FIG. 2 is not of sufficient size to display the current temperatures of all working loops, the microcontroller 52 can be programmed to alternately display different groups of temperature readings on a timed or keyed basis.

The program routine of FIG. 8 concludes by determining in decision block 230 whether any of the keys 42–48 of the keypad 53 has been pressed. If so, the microcontroller proceeds to decision block 232 and processes the corresponding user command. The user command may, for example, be a setup parameter input or a command to cancel an under-temperature or over-temperature alarm which has occurred. If no keys are found to have been pressed in decision block 230, the microcontroller returns to decision block 202 and waits for the next 1-second interval to elapse. By virtue of the 1-second timer function represented by the decision block 202, the cycle time of the multiple-loop controller as a whole (i.e, the interval between successive readings of a given RTD sensor) is set at one second. In practice, the time required to process all 14 loops will ordinarily be less than one second, and in that event the microcontroller simply remains idle (apart from processing interrupts) until the remainder of the 1-second interval has expired.

As indicated previously, the A/D converter 92 of FIGS. 4 and 7 is preferably a sigma delta (charge balancing) analog-to-digital converter. Although this type of A/D converter is characterized by high resolution, low nonlinearity error and superior filtering of line frequency noise, the response time of the converter is relatively slow due to the long settling time (approximately 50 milliseconds) of the internal digital filter. If the microcontroller 52 is required to remain idle during this period, the cumulative delay time becomes unduly long as the number of temperature loops is increased. This requires either that the number of temperature loops be limited, or that the overall cycle time be increased. In order to avoid these results, it is preferable to utilize the interrupt capability of the microcontroller 52 to allow the microcontroller to carry out other functions while the digital filter of the A/D converter 92 is settling. Thus, with reference to FIG. 8, the microcontroller proceeds directly from the output duty cycle updating step in block 220 to the alarm processing, temperature display and user command processing steps of blocks 226–232. In the meantime, the A/D converter 92 of FIG. 7 processes the analog voltage of the next temperature loop as applied between the input lines AIN1+ and AIN1–, and produces an output signal on the DRDY (Data Ready) line when a digital output value is ready to be clocked out on the SDATA output line of the converter. The DRDY line of the A/D converter 92 is coupled to the interrupt input INT1 of the microcontroller 52 in FIG. 5, so that the microcontroller 52 will be interrupted whenever the DRDY signal occurs. During the interrupt, the microcontroller 52 executes an interrupt routine stored in the EPROM 56, during which the functions represented by the blocks 214–220 in FIG. 8 are carried out. After each loop is processed (i.e., after each RTD sensor is read and the duty cycle of the corresponding resistance heating device is modified), the microcontroller increments a loop counter and exits the interrupt routine. The interrupt routine contains separate portions which control the multiplexer switching, PID calculation and output duty cycle control for each temperature loop, and the loop counter defines corresponding entry points into the interrupt routine for the microcontroller as each successive temperature loop in processed. By processing the various temperature loops during microcontroller interrupts, the delays associated with the A/D converter 92 are minimized and processing speed is increased. The zero and full scale calibration operations represented by blocks 206 and 210 in FIG. 8, which will be described in more detail in connection with FIGS. 9 and 10, are also preferably carried out during microcontroller interrupts, and user commands may also be processed in this way.

In order to increase processing speed still further, the microcontroller is preferably programmed to cause the A/D converter 92 to begin reading the analog temperature value from the next RTD sensor immediately after entering the interrupt routine. This is accomplished by immediately switching the multiplexers 74–80 to the next channel when the interrupt is commenced, and by resetting the digital filter in the A/D converter 92 (by bringing the SYNC line of the A/D converter 92 to a low logic level) to begin conversion of the next RTD sensor voltage at that time. The operation of the A/D converter 92 is such that the previous digital temperature value will remain latched in the output register until the new value has settled, and this affords the microcontroller 52 sufficient time after switching the multiplexers 74–80 and resetting the digital filter of the A/D converter to read the previous value by clocking the SCLK input of the A/D converter 92 and receiving serial data from the SDATA output. Thus, for example, when the microcontroller 52 enters the interrupt routine in order to process the temperature loop associated with the RTD sensor 82-1, the first action carried out by the microcontroller is to switch the multiplexers 74–80 to the next channel in order to receive an input from the RTD sensor 82-2, and to reset the digital filter of the A/D converter 92 to commence A/D conversion of the analog temperature value from the RTD sensor 82-2. While conversion of the analog voltage from the RTD sensor 82-2 is occurring, the microcontroller reads the digital temperature value corresponding to the previous RTD sensor 82-1 at the output of the A/D converter 92. By operating the microcontroller 52 and A/D converter 92 in this manner, and by using microcontroller interrupts to carry out temperature measurements and calibrations as described previously, delays resulting from the settling time of the A/D converter 92 can be minimized.

Figure 9:
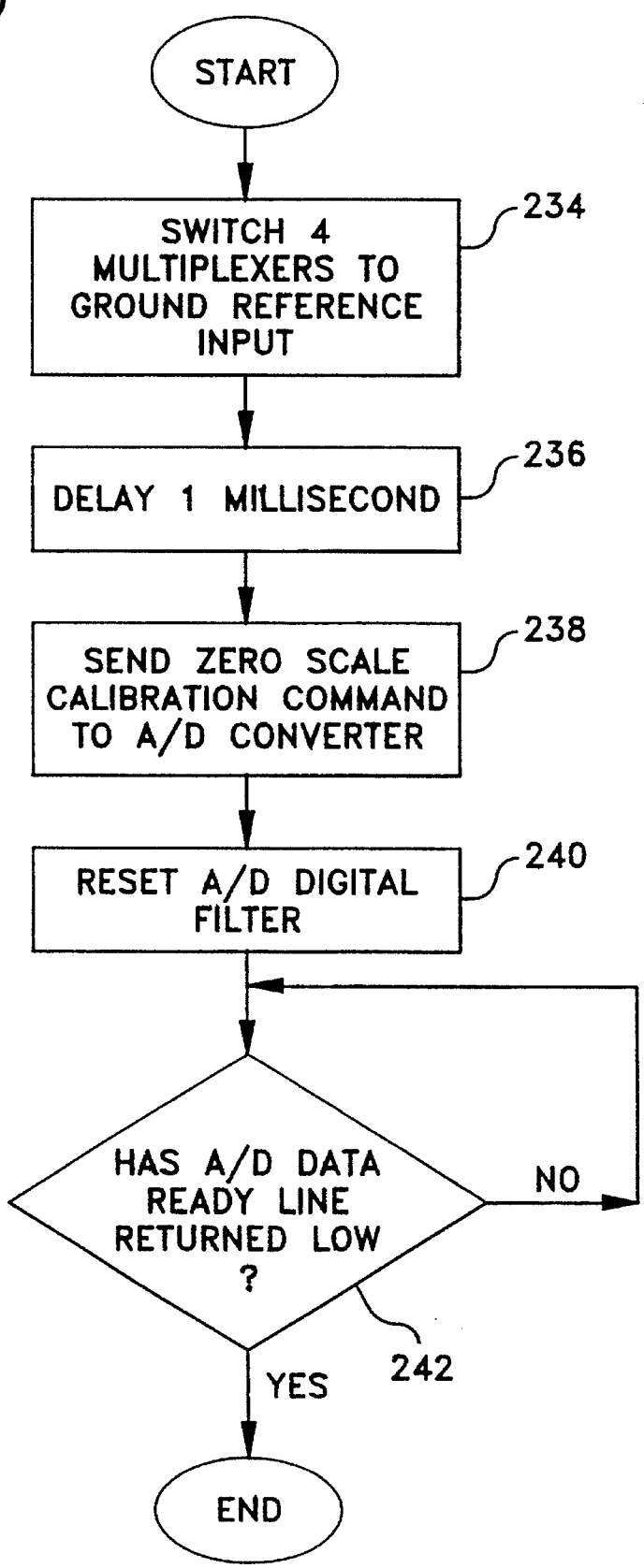
FIGS. 9 and 10 are flow charts illustrating in more detail the manner in which the microcontroller is programmed to carry out continuous zero and full scale calibration of the multiple-loop temperature controller.
Figure 10:
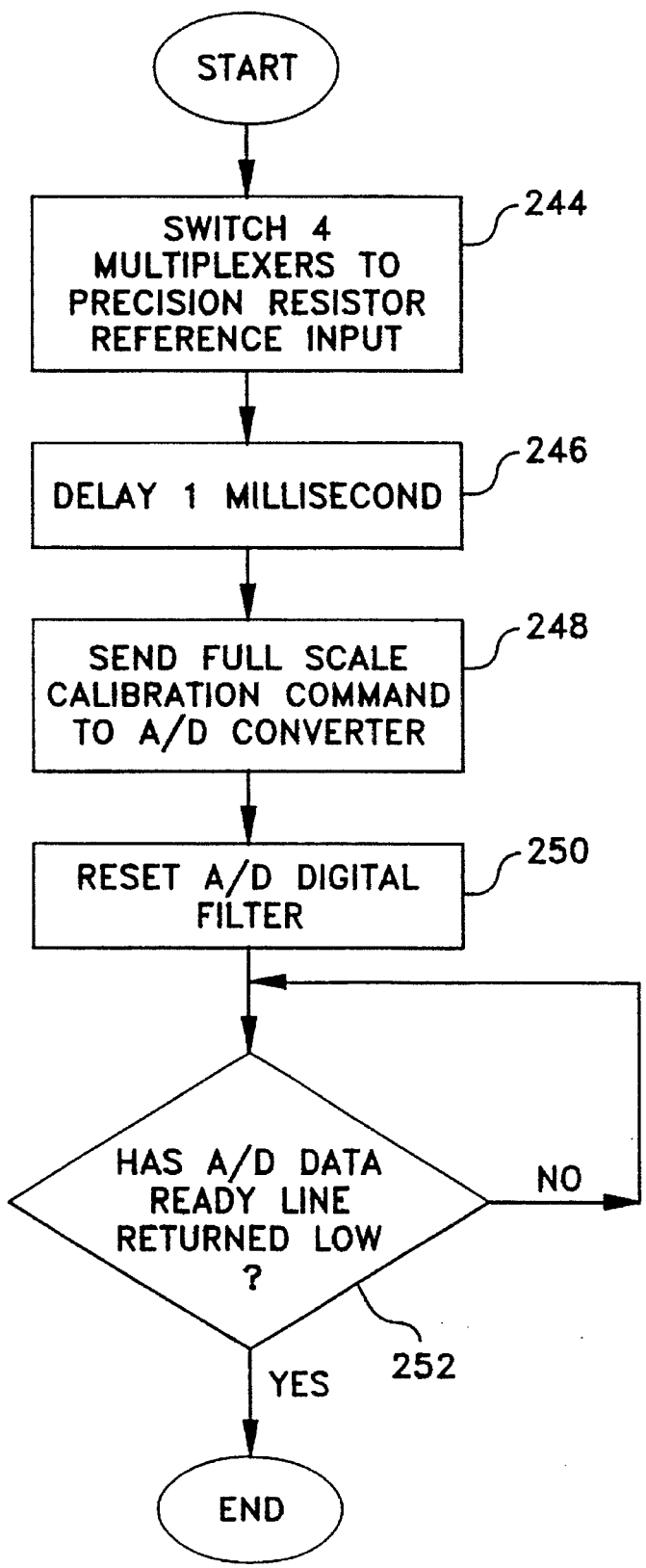

FIGS. 9 and 10 are detailed flow charts illustrating the manner in which the zero scale and full scale calibration operations in blocks 206 and 210 of FIG. 8 are carried out. Referring first to FIG. 9, the microcontroller 52 begins the zero scale calibration operation in block 234 by switching the four multiplexers 74–80 of FIGS. 4 and 7 to the ground reference input (channel 15). After a 1-millisecond delay in block 236, the microcontroller sends a zero scale calibration command to the A/D converter 92. The microcontroller 52 then resets the A/D digital filter in block 240, and repeatedly checks in decision block 242 to determine whether the DRDY output line has returned to a low logic level to indicate the presence of data at the SCLK output. Once this occurs, the calibration operation is complete. The full scale calibration operation of FIG. 10 is carried out in essentially the same manner, and the operations represented by the blocks 244–252 of FIG. 10 are essentially equivalent to those represented by the blocks 234–242 in FIG. 9. In block 244, however, the multiplexers 74–80 are each switched to channel 16, the inputs connected to the precision calibrating resistor 112, rather than to channel 15 as described previously. Similarly, the command sent to the A/D converter 92 in block 248 is a full scale calibration command, rather than a zero scale calibration command as described above.

Although the present invention has been described with reference to a preferred embodiment thereof, various modifications and substitutions will occur to those of ordinary skill in the art. For example, the multiple-loop temperature controller need not maintain a constant set point temperature for each rack or loop, but may instead be programmed to vary the temperature in accordance with a predetermined schedule, such as a "ramp and soak" temperature profile. Moreover, it will be apparent that the principles of the present invention are applicable to temperature measurement and/or control systems other than those used in automated blood culturing systems, and also to systems in which parameters other than temperature are measured and/or controlled. These and other modifications and substitutions are intended to fall within the scope of the invention as defined in the appended claims.

What is claimed is:

1. A continuously calibrating measurement system comprising:

a first input line adapted to be connected to a sensor for sensing a parameter to be measured and producing an output signal representative thereof;

a first output line adapted to be connected to said sensor for applying a current to said sensor to cause said sensor to produce said output signal;

a second input line adapted to be connected to a first calibration device for establishing a first calibration value representative of said sensor output signal;

a second output line adapted to be connected to said first calibration device for applying a current to said first calibration device to cause said first calibration device to establish said first calibration value;

a control device coupled to said first and second input lines and to said first and second output lines for producing an output value of said parameter during each of a plurality of successive cycles of operation, said control device including a current source and being operative to perform a measurement of said sensor output signal on said first input line during each of said successive cycles of operation by coupling said current source to said first output line, and to perform a first calibration operation using said first calibration value on said second input line during at least some of said successive cycles of operation by coupling said current source to said second output line.

2. A continuously calibrating measurement system as claimed in claim 1, wherein said sensor output signal comprises an analog output signal, said control device further comprises an analog-to-digital converter for converting said analog output signal to a digital output value, and said first calibration operation comprises calibration of said analog-to-digital converter.

3. A continuously calibrating measurement system as claimed in claim 2, wherein said control device further comprises a multiplexer connected between an input of said analog-to-digital converter and said first and second input lines for coupling only one of said first and second input lines at a time to said input of said analog-to-digital converter.

4. A continuously calibrating measurement system as claimed in claim 3, wherein said control device further comprises an amplifier connected between an output of said multiplexer and said input of said analog-to-digital converter.

5. A continuously calibrating measurement system as claimed in claim 3, wherein said control device further comprises a microcontroller coupled to said multiplexer and to said analog-to-digital converter for controlling the operation thereof.

6. A continuously calibrating measurement system as claimed in claim 1, wherein said sensor comprises a temperature sensor and said parameter to be measured comprises temperature.

7. A continuously calibrating measurement system as claimed in claim 6, wherein said temperature sensor comprises a resistance temperature device and said first calibration device comprises a precision resistor.

8. A continuously calibrating measurement system as claimed in claim 1, further comprising:
  a third input line adapted to be connected to a second calibration device for establishing a second calibration value representative of said sensor output signal; and
  a third output line adapted to be connected to said second calibration device for applying a current to said second calibration device to cause said second calibration device to establish said second calibration value;
  said control device being coupled to said third input line and to said third output line and being operative to perform a second calibration operation using said second calibration value on said second input line during at least some of said successive cycles of operation by coupling said current source to said third output line.

9. A continuously calibrating measurement system as claimed in claim 8, wherein said first calibration value comprises a zero scale value and said second calibration value comprises a full scale value.

10. A continuously calibrating measurement system as claimed in claim 9, wherein said first and second calibration operations are performed during different ones of said successive cycles of operation.

11. A continuously calibrating measurement system as claimed in claim 10, wherein at least one of said first and second calibration operations is performed during each of said successive cycles of operation.

12. A continuously calibrating measurement system as claimed in claim 1, further comprising additional first input and output lines adapted to be connected to additional sensors for sensing said parameter to be measured and producing output signals representative thereof, said control device being coupled to said additional first input and output lines for producing additional output values of said parameter during each of said cycles of operation.

13. A continuously calibrating measurement system as claimed in claim 12, wherein said measurement system forms a part of a multiple-loop controller which further comprises a plurality of outputs coupled to said control device and adapted to be connected to a corresponding plurality of output devices associated with respective ones of said sensors, said control device being operative to control each of said output devices in accordance with the output value from the associated one of said sensors to maintain a desired set point value of said parameter.

14. A continuously calibrating measurement system as claimed in claim 13, wherein said sensors comprise temperature sensors, said parameter to be measured comprises temperature, and said output devices comprise temperature controlling devices.

15. A method for operating a measurement system including a current source, a sensor and a first calibration device, said method comprising the steps of:
  establishing a plurality of successive cycles of operation of said measurement system;
  during each of said successive cycles of operation, causing said measurement system to perform a measurement operation by coupling said current source to said sensor to cause said sensor to produce a measurement signal representative of a parameter to be measured, and producing an output value of said parameter; and
  during at least some of said successive cycles of operation, calibrating said measurement system by coupling said current source to said first calibration device to cause said first calibration device to produce a first calibration value representing a first reference value of said measurement signal.

16. A method for operating a measurement system as claimed in claim 15, wherein said measurement system further comprises a second calibration device, said method further comprising the step of:
  during at least some of said successive cycles of operation, calibrating said measurement system by coupling said current source to said second calibration device to cause said second calibration device to produce a second calibration value representing a second reference value of said measurement signal.

17. A method for operating a measurement system as claimed in claim 16, wherein said first calibration value comprises a zero scale value and said second calibration value comprises a full scale value.

18. A method for operating a measurement system as claimed in claim 17, wherein said first and second calibration values are used to calibrate said measurement system during different ones of said successive cycles of operation.

19. A method for operating a measurement system as claimed in claim 18, wherein at least one of said first and second calibration values is used to calibrate said measurement system during each of said successive cycles of operation.

20. A method for operating a measurement system as claimed in claim 15, wherein said measurement system performs a plurality of measurement operations using a plurality of measurement signals to produce a corresponding plurality of output values of said parameter during each of said successive cycles of operation.

21. A method for operating a measurement system as claimed in claim 20, further comprising the step of using each of said output values of said parameter to control a corresponding output device in order to maintain a desired set point value of said parameter.

22. A method for operating a measurement system as claimed in claim 21, wherein said parameter comprises temperature and said output devices comprise temperature controlling devices.

23. A multiple-channel temperature measurement system comprising:
   a plurality of temperature inputs adapted to be connected to a corresponding plurality of resistance temperature devices for sensing temperatures at a plurality of locations;
   a current circuit for applying a known current to a selected one of said resistance temperature devices through the corresponding one of said temperature inputs to produce an analog voltage output indicative of a sensed temperature;
   a measurement circuit for converting said analog voltage to a temperature value;
   a first multiplexer circuit connected between said current circuit and said plurality of temperature inputs for selectively connecting said current circuit to individual ones of said resistance temperature devices;
   a second multiplexer circuit connected between said measurement circuit and said plurality of temperature inputs for selectively connecting said measurement circuit to individual ones of said resistance temperature devices; and
   a control circuit for controlling said first and second multiplexer circuits to successively connect each of said temperature inputs to said current circuit and simultaneously to said measurement circuit.

24. A multiple-channel temperature measurement system as claimed in claim 23, further comprising at least one calibrating input adapted to be connected to a calibrating resistor for calibrating said measurement circuit, said first and second multiplexer circuits being operative to selectively connect said current circuit and said measurement circuit to said calibrating input under the control of said control circuit.

25. A multiple-channel temperature measurement system as claimed in claim 23, wherein said measurement circuit comprises an analog-to-digital converter.

26. A multiple-channel temperature measurement system as claimed in claim 23, wherein:
   said current circuit comprises first and second current sources which produce known currents that are substantially identical to each other in value;
   said first multiplexer circuit comprises first and second multiplexers, said first multiplexer applying current from said first current source to positive terminals of said resistance temperature devices through first leads coupled to said temperature inputs, and said second multiplexer applying current from said second current source to negative terminals of said resistance temperature devices through second leads coupled to said temperature inputs, each of said second leads being of substantially the same length as the corresponding one of said first leads;
   said second multiplexer circuit comprises third and fourth multiplexers, said third multiplexer coupling said positive terminals of said resistance temperature devices to a first input terminal of said measurement circuit through said temperature inputs, and said fourth multiplexer connecting said negative terminals of said resistance temperature devices to a second input terminal of said measurement circuit through said temperature inputs; and
   said measurement circuit comprises a differential amplifier having its inputs connected to said first and second input terminals.

27. A multiple-channel temperature measurement system as claimed in claim 23, wherein said measurement circuit further comprises an analog-to-digital converter having an input connected to an output of said differential amplifier.

28. A multiple-channel temperature measurement system as claimed in claim 23, wherein said measurement system forms a part of a multiple-loop temperature controller which further comprises a plurality of outputs coupled to said control circuit and adapted to be connected to a corresponding plurality of temperature controlling devices associated with respective ones of said resistance temperature devices, said control circuit being operative to control each of said temperature controlling devices in accordance with temperature values from said measurement circuit to maintain a desired set point temperature at the corresponding resistance temperature device location. common measurement circuit simultaneously to a calibrating resistor for calibrating said measurement circuit.

29. A method for performing multiple-channel temperature measurements, comprising the steps of:
   providing a plurality of resistance temperature devices for sensing temperature at a plurality of locations;
   providing a common current circuit for applying a known current to a selected ones of said resistance temperature devices to produce analog voltage outputs indicative of sensed temperatures;
   providing a common measurement circuit for converting said analog voltage outputs to temperature values; and
   connecting said common current circuit and said common measurement circuit simultaneously to individual ones of said resistance temperature devices in succession in order to obtain successive temperature values for said plurality of locations.

30. A method for performing multiple-channel temperature measurements as claimed in claim 29, further comprising the step of connecting said common current circuit and said common measurement circuit simultaneously to a calibrating resistor for calibrating said measurement circuit.

31. A method for performing multiple-channel temperature measurements as claimed in claim 29, wherein said common current circuit comprises first and second current sources which produce known currents that are substantially identical to each other, and wherein the step of connecting said common current circuit and said common measurement circuit simultaneously to individual ones of said resistance temperature devices in succession comprises, for each of said resistance temperature devices, the following steps:
   connecting said first current source to a positive terminal of said resistance temperature device through a first lead;
   connecting said second current source to a negative terminal of said resistance temperature device through a second lead substantially equal in length to said first lead;
   connecting ends of said first and second leads proximate to said first and second current sources to said common measurement circuit; and
   causing said common measurement circuit to measure the differential analog voltage across said first and second leads.

32. A method for performing multiple-channel temperature measurements as claimed in claim 31, further comprising the step of causing said measurement circuit to convert said differential analog voltage to a digital temperature value.

33. A method for performing multiple-channel temperature measurements as claimed in claim 29, further comprising the step of controlling a plurality of temperature controlling devices associated with respective ones of said resistance temperature devices in accordance with temperature values from said common measurement circuit in order to maintain desired set point temperatures at the corresponding resistance temperature device locations.

34. A measurement system comprising:

a first input line adapted to be connected to a first sensor for sensing a parameter to be measured and producing an analog output signal representative thereof;

an analog-to-digital converter for converting an analog output signal from said first sensor to a digital output value, said analog-to-digital converter having an analog input coupled to said first input line, a digital output, and a data ready output; and a programmable microprocessor coupled to said digital output for processing said digital output value, said microprocessor having an interrupt input coupled to said data ready output of said analog-to-digital converter and being programmed to process said digital output value in response to an interrupt signal on said interrupt input.

35. A measurement system as claimed in claim 34, further comprising:

a second input line adapted to be connected to a second sensor for sensing a parameter to be measured and producing an analog output signal representative thereof; and a multiplexer coupled to and controlled by said microprocessor, said multiplexer being connected between said analog input of said analog-to-digital converter and said first and second input lines for coupling only one of said first and second input lines at a time to said analog input of said analog-to-digital converter;

wherein said microprocessor is further programmed to switch said multiplexer from one of said first and second input lines to the other of said first and second input lines after receiving said interrupt signal and before processing a digital output from said analog-to-digital converter.

36. A measurement system as claimed in claim 34, wherein said first sensor comprises a temperature sensor and said parameter to be measured comprises temperature.

37. A measurement system as claimed in claim 34, wherein said analog-to-digital converter comprises a sigma delta analog-to-digital converter.

38. A method for operating a measurement system comprising a first sensor, an analog-to-digital converter, and a microprocessor, said method comprising the steps of:

producing an analog output from said first sensor representing a parameter to be measured;

coupling said analog output to an analog input of said analog-to-digital converter;

producing a data ready output from said analog-to-digital converter when digital data is available at a digital output of said analog-to-digital converter;

triggering an interrupt in said microprocessor in response to said data ready output; and causing said microprocessor to process said digital data during said interrupt.

39. A method for operating a measurement system as claimed in claim 38, wherein said measurement system further comprises a second sensor and a multiplexer controlled by said microprocessor for coupling one of said first and second sensors to said analog input of said analog-to-digital converter, and wherein said method further comprises the step of switching said multiplexer to couple said second sensor to said analog input of said analog-to-digital converter after receiving said interrupt signal and before processing said digital data from said analog-to-digital converter.

40. A method for operating a measurement system as claimed in claim 38, wherein said first sensor comprises a temperature sensor and said parameter to be measured comprises temperature.

41. A method for operating a measurement system as claimed in claim 38, wherein said analog-to-digital converter comprises a sigma delta analog-to-digital converter.

* * * * *